United States Patent
Erol et al.

(10) Patent No.: US 7,774,705 B2
(45) Date of Patent: Aug. 10, 2010

(54) INTERACTIVE DESIGN PROCESS FOR CREATING STAND-ALONE VISUAL REPRESENTATIONS FOR MEDIA OBJECTS

(75) Inventors: Berna Erol, Cupertino, CA (US);
Jonathan J. Hull, San Carlos, CA (US);
Jamey Graham, San Jose, CA (US);
Dar-Shyang Lee, Union City, CA (US);
Peter E. Hart, Menlo Park, CA (US)

(73) Assignee: Ricoh Company, Ltd., Tokyo (JP)

( * ) Notice: Subject to any disclaimer, the term of this patent is extended or adjusted under 35 U.S.C. 154(b) by 816 days.

(21) Appl. No.: 10/952,606

(22) Filed: Sep. 28, 2004

(65) Prior Publication Data
US 2006/0067593 A1    Mar. 30, 2006

(51) Int. Cl.
*G06F 3/00* (2006.01)
*G06F 3/12* (2006.01)
*G06K 15/00* (2006.01)

(52) U.S. Cl. .................. 715/719; 715/722; 235/432; 358/1.18

(58) Field of Classification Search .............. 715/700, 715/704, 714, 719–726, 730–731, 962; 375/240.26; 235/432; 358/1.17, 1.18
See application file for complete search history.

(56) References Cited

U.S. PATENT DOCUMENTS

| | | | |
|---|---|---|---|
| 5,485,554 A * | 1/1996 | Lowitz et al. ............ 358/1.17 |
| 5,625,721 A | 4/1997 | Lopresti et al. | |
| 5,748,807 A | 5/1998 | Lopresti et al. | |
| 5,896,403 A * | 4/1999 | Nagasaki et al. ............ 714/752 |
| 6,006,241 A | 12/1999 | Purnaveja et al. | |
| 6,641,053 B1 | 11/2003 | Breidenbach et al. | |

(Continued)

FOREIGN PATENT DOCUMENTS

EP    0670555 A1    9/1995

(Continued)

OTHER PUBLICATIONS

Baird, H.S. et al.; "Document Defect Models", Structured Document Image Analysis; 1992, *AT&T Bell Laboratories*, pp. 546-556.

(Continued)

*Primary Examiner*—William L Bashore
*Assistant Examiner*—Andrew Tank
(74) *Attorney, Agent, or Firm*—Townsend and Townsend and Crew LLP

(57) ABSTRACT

Techniques for an iterative design process of determining a visual representation for an input media object are provided. One or more visual representations are determined from the input media object based on a set of encoding parameters. An output media object is created from the visual representation(s) based on a set of decoding parameters. The visual representation(s) and/or the second media object may be displayed to a user. An indication indicating whether the visual representation(s) and/or the second media object are acceptable or unacceptable is received. If the visual representation(s) and/or the second media object are not acceptable, then at least one parameter in at least one of the set of encoding parameters and the set of decoding parameters may be changed. The process described above is repeated until the visual representation(s) and the second media object are determined to be acceptable.

81 Claims, 21 Drawing Sheets

U.S. PATENT DOCUMENTS

| | | | |
|---|---|---|---|
| 6,789,123 B2 * | 9/2004 | Li et al. | 709/231 |
| 6,988,245 B2 | 1/2006 | Janevski | |
| 7,072,575 B2 | 7/2006 | Kang | |
| 2002/0135808 A1 | 9/2002 | Parry | |
| 2002/0186774 A1 * | 12/2002 | Pau et al. | 375/240.26 |
| 2003/0058340 A1 | 3/2003 | Yun-Ting et al. | |
| 2004/0143434 A1 | 7/2004 | Divakaran et al. | |
| 2004/0181747 A1 | 9/2004 | Hull et al. | |
| 2004/0186718 A1 | 9/2004 | Nefian et al. | |
| 2006/0070006 A1 | 3/2006 | Erol et al. | |
| 2006/0072165 A1 | 4/2006 | Erol et al. | |

FOREIGN PATENT DOCUMENTS

| | | |
|---|---|---|
| EP | 0926879 A2 | 6/1999 |
| EP | 1387560 A2 | 2/2004 |
| WO | WO 0119082 A1 * | 3/2001 |

OTHER PUBLICATIONS

Bansal, Pankaj et al., "Improved error detection and localization techniques for MPEG-4 video", 2002, *International Conference on Image Processing*, pp. 693-696.

Canon Movie-PhotoPrint Catalog, http://cweb.canon.jp/hps/guide/rimless.html., 3 pages.

Denso-Wave, http://denso.wave.com/qrcode/vertable1-e.html.

Gallant, Michael et al. "Standard-compliant multiple description video coding"; 2001, *International Conference on Image Processing*, pp. 946-949.

Hong, Pengyu et al.; "IFACE: A 3D synthetic talking face"; 2001, *International Journal of Image and Graphics*, vol. 1, No. 1, pp. 19-26.

Rabiee, Hamid R. et al.; "Error concealment of still image and video streams with multi-directional recursive nonlinear filters"; 1996, *International Conference on Image Processing*, pp. 37-40.

Uchihashi, Shingo et al.; "Video Manga: Generating Semantically Meaningful Video Summaries"; 1999, *Proc. ACM Multimedia* vol. 99, 383-392.

Hull, Jonathan J. et al.; "Visualizing Multimedia Content on Paper Documents: Components of Key Frame Selection for Video Paper"; 2003, *Proceedings of the Seventh International Conference on Document Analysis and Recognition*, pp. 389-392.

Motwani, Rakhi C. et al.; "Collocated Dataglyphs for Large Message Storage and Retrieval"; 2004, *Proceedings of the SPIE-The International Society for Optical Engineering*, vol. 5306, pp. 173-183.

Rees, David et al.; "The CLICK (CSIRO Laboratory for Imaging by Content and Knowledge) Security Demonstrator"; 1997, *Proceedings of the Institute of Electrical and Electronics Engineers 31st Annual Conference*, pp. 190-201.

Non-Final Office Action for U.S. Appl. No. 10/954,069, mailed on Jun. 24, 2009, 13 pages.

Non-Final Office Action for U.S. Appl. No. 10/953,439, mailed on Jun. 22, 2007, 14 pages.

Final Office Action for U.S. Appl. No. 10/953,439, mailed on Dec. 10, 2007, 12 pages.

Advisory Action for U.S. Appl. No. 10/953,439, mailed on Mar. 28, 2008, 4 pages.

Non-Final Office Action for U.S. Appl. No. 10/953,439, mailed on Aug. 4, 2008, 13 pages.

Final Office Action for U.S. Appl. No. 10/953,439, mailed on Feb. 3, 2009, 9 pages.

Non-Final Office Action for U.S. Appl. No. 10/953,439, mailed on Jun. 10, 2009, 10 pages.

* cited by examiner

INTERACTIVE DESIGN PROCESS FOR CREATING STAND-ALONE VISUAL REPRESENTATIONS FOR MEDIA OBJECTS

CROSS-REFERENCES TO RELATED APPLICATIONS

The following applications are incorporated by reference, as if set forth in full in this document, for all purposes:

U.S. patent application Ser. No. 10/954,069 filed Sep. 28, 2004 entitled METHOD FOR ENCODING MEDIA OBJECTS TO A STILL VISUAL REPRESENTATION, filed concurrently with the present application, and U.S. patent application Ser. No. 10/953,439 filed Sep. 28, 2004 entitled METHOD FOR DECODING AND RECONSTRUCTING MEDIA OBJECTS FROM A STILL VISUAL REPRESENTATION, filed concurrently with the present application.

BACKGROUND OF THE INVENTION

The present invention generally relates to multimedia information processing systems and more particularly to methods and apparatus for designing a visual representation determined from an input media object, where the visual representation can be used to construct an output media object.

With the rapid growth of computers, an increasing amount of information is being stored in the form of electronic (or digital) documents. These electronic documents include multimedia documents that store multimedia information. The term "multimedia information" is used to refer to information that may comprise information of one or more types. The one or more types may be in some integrated form. For example, multimedia information may include a combination of text information, graphics information, animation information, sound (audio) information, video information, and the like. Multimedia information is also used to refer to information comprising one or more media objects where the one or more media objects include information of different types. For example, media objects included in multimedia information may comprise text information, graphics information, animation information, sound (audio) information, video information, and the like. An example of media object may be a video that includes time variant information. For example, the video may include a sequence of key frames over a period of time.

Typically, the media object is stored in electronic storage. The media object may then be accessed from the electronic storage when a user wants to play the multimedia information included in the media object. Storing the media object in electronic storage is sometimes not convenient. For example, a device allowing access to the electronic storage may not be available. Also, the electronic storage device may not be portable and thus cannot be easily moved. Accordingly, access to a media object stored on an electronic storage device may not always be possible. Thus, the places a user may play the media object may be restricted. For example, the user may be restricted to only playing a media object on his/her desktop computer because the media object is stored on the computer's hard drive.

A popular display medium is paper. For example, photos are often displayed on paper because of its high resolution, ease of handling, portability, and no power consumption. One attempt at representing multimedia information on paper is printing the multimedia information in flipbooks. Flipbooks include a different piece of multimedia information that is printed on successive pieces of paper. Thus, when the user flips through the papers, the multimedia information appears as if it is being played back.

Flipbooks include many disadvantages. For example, a large amount of paper is used for the construction of these books. Additionally, flipping through a flipbook may also make the multimedia information hard to understand. Further, a flipbook is designed to only represent graphical multimedia information. Thus, information, such as audio, cannot be represented in a flipbook.

A method of creating a visual representation from an input media object is disclosed in co-pending U.S. patent application Ser. No. 10/954,069, filed concurrently with the present application, entitled METHOD FOR ENCODING MEDIA OBJECTS TO A STILL VISUAL REPRESENTATION and a method of decoding the visual representation to create an output media object is disclosed in co-pending U.S. patent application Ser. No. 10/953,439, filed concurrently with the present application, entitled METHOD FOR DECODING AND RECONSTRUCTING MEDIA OBJECTS FROM A STILL VISUAL REPRESENTATION. The design of the visual representation can be performed using many combinations of parameters. Accordingly, apparatus and methods for designing visual representations for multimedia information are desired.

BRIEF SUMMARY OF THE INVENTION

The present invention generally relates to an iterative design process of determining a visual representation for a media object.

In one embodiment, a method for determining a visual representation for an input media object is provided. One or more visual representations are determined from the input media object based on a set of encoding parameters. An output media object is then created from the one or more visual representations based on a set of decoding parameters. The one or more visual representations and/or the second media object may be displayed to a user. An indication indicating whether one or more visual representations and/or the second media object is acceptable or unacceptable is then received. If the one or more visual representations and/or the second media object is not acceptable, then at least one parameter in at least one of the set of encoding parameters and the set of decoding parameters may be changed. The process described above is then repeated until the one or more visual representations and the second media object is determined to be acceptable.

In one embodiment, a method for determining a visual representation for an input media object is provided. The method comprises: (a) determining one or more visual representations from the input media object based on a set of encoding parameters; (b) creating an output media object from the one or more visual representations based on a set of decoding parameters; (c) receiving an indication indicating that the one or more visual representations or the output media object are acceptable or unacceptable; (d) if the indication indicates that the one or more visual representations or the output media object are unacceptable, changing at least one parameter in an element selected from a group consisting of the set of encoding parameters and the set of decoding parameters; (e) performing steps (a)-(d) until an indication indicating that the one or more visual representations or second media object are acceptable is received.

In another embodiment, a method for determining a first visual representation and a second visual representation for an input media object is provided. The method comprises: (a)

determining a first visual representation based on first information from the input media object; (b) determining a second visual representation based on second information from the input media object; (c) creating an output media object from the first and second visual representations; (d) receiving an indication indicating that an element selected from a group consisting of the first visual representation, second visual representation, and the output media object are acceptable or unacceptable; (e) if the indication indicates that an element selected from a group consisting of the first visual representation, second visual representation, and the output media object are unacceptable, performing steps (a)-(d) to generate an element selected from a group consisting of a new first visual representation, a new second visual representation, and a new output media object until an indication indicating that the first visual representation, second visual representation, and the second media object are acceptable is received.

A further understanding of the nature and the advantages of the inventions disclosed herein may be realized by reference of the remaining portions of the specification and the attached drawings.

DETAILED DESCRIPTION OF THE INVENTION

Embodiments of the present invention provide methods and apparatus for encoding an input media object into first and second visual representations. The first and second visual representations may then be decoded to construct an output media object. Also, an interactive design process for determining the first and second visual representations is provided. The above will now be described in the sections: Encoding, Decoding, and Interactive Design Process.

Encoding

Figure 1:
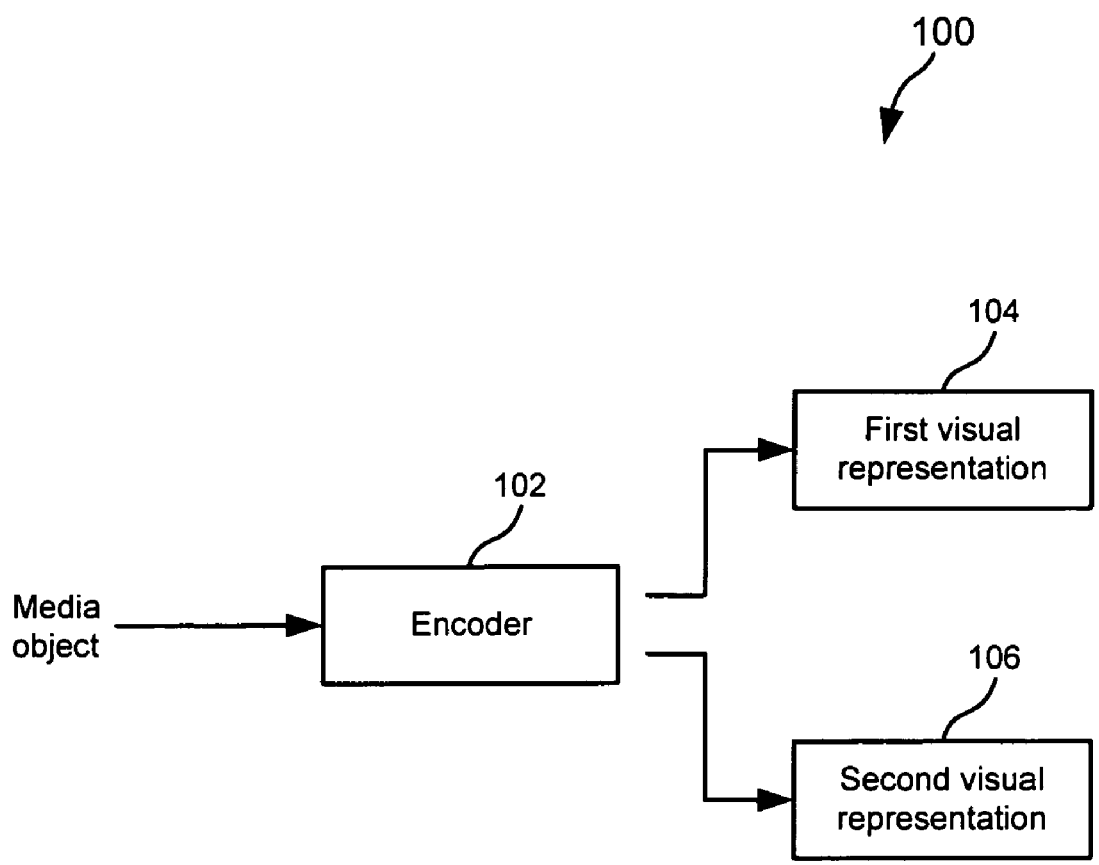
FIG. 1 depicts a system for encoding an input media object according to one embodiment of the present invention.

FIG. 1 depicts a system 100 for encoding an input media object according to one embodiment of the present invention. As shown, encoder 102 receives an input media object and outputs a first visual representation 104 based on first information and a second visual representation 106 based on second information.

Although first and second information are described, it should be understood that any number of different sets information may be determined. As will be described below, a first visual representation 104 is determined from the first information and a second visual representation 106 is determined from the second information. It should be recognized that any number of visual representations may be determined from any amount of information determined from an input media object. For example, multiple visual representations may be created based on just the first information, a visual representation may be created based on first, second, . . . , N information, etc.

A media object includes any time variant information. Time variant information may be information that differs with the passage of time. For example, time variant information may include multimedia information. The multimedia information may include video, image, audio, text, graphics, animation information, etc. In one example, a media object may include a video sequence that may be frame-based or arbitrarily shaped video, audio, animations, graphics, etc. A person of skill in the art will appreciate other examples of media objects.

Encoder 102 may be any device configured to determine first and second information from the input media object.

Although first and second information is described, it should be understood that any number of information may be determined. For example, third information may be determined and used to create a visual representation as described below. The In one embodiment, encoder 102 may use techniques included in an MPEG-4 encoder, flash encoder, MPEG-2 encoder, speech-to-text converter, etc.

In one embodiment, the first information may include any information determined from the input media object. The first information may serve as a reference. The reference may be information in which second information can be applied to create an output media object. For example, the first information may be image-based reference information. The image-based reference information may be a bits for a static image determined from the input media object. For example, the image-based reference information may be one or more key frames extracted from the input media object. Also, the first information may be text information determined from audio information.

In one embodiment, the first information may be determined by selecting a key frame or key frames from the media object. For example, the key frame is selected as the first frame in a motion video animation, or selected such that the second information that needs to be encoded for animation (e.g., motion vectors or prediction errors) is minimized.

The second information may be any information determined from the input media object. For example, the second information may be information that may be applied to the first information to create an output media object. For example, the second information may be motion information, such as binary or side channel information. The second information may be information that may be used to construct an output media object using the first information. For example, the motion information may be used to manipulate the image-based reference information.

In one embodiment, the second information may include a bit stream that may be similar to any standard-based or proprietary-coded bit stream (MPEG-4, flash windows media, etc.). The second information may include information on how to register a key frame (its resolution, printed size, color histogram, background color, chroma key color, etc.), motion vectors, prediction errors, side information, decoder information (e.g., information describing how to decode the bit streams), descriptors (e.g., MPEG-7 or other proprietary descriptors), audio, hyperlinks, etc.

A first visual representation 104 is determined based on the first information. For example, if the first information is a key frame, the key frame may be used as first visual representation 104. Also, if the first information is in a format that may need further encoding to generate a visual representation, further encoding is performed. For example, if the first information is in a JPEG format, the information may be encoded into a visual representation. Also, information may be added to the first information. For example, markers that may be used to locate first visual representation 104 may be added.

Second visual representation 106 is determined based on the second information. Second visual representation 106 may be determined such that the second information is encoded into a compact form. For example, the second information may be encoded into a machine-readable form, such as a barcode. Also, second visual representation 106 may be other visual representations, such as a vector diagram, or other visual representations that may be decoded into the second information.

First and second visual representations 104 and 106 may be a static image when displayed or printed on a medium. Accordingly, time variant information from the input media object is encoded into a static image format. The static image may then be used to construct an output media object that includes time variant information, which will be described in more detail below.

In one embodiment, an input media object may be a motion video or animation. The first information may be a key frame and second information may be manipulation information that may be used to manipulate the key frame. An example of a first visual representation 104 includes a key frame representation determined from the first information. Second visual representation 106 may be a machine-readable compact representation of the manipulation information, such as a bar code.

The information in second visual representation 106 may then be used to manipulate first visual representation 104. For example, second visual representation 106 may be a bar code that includes encoded information that is used to determine any motion, animation, and/or prediction error information for the key frame. Additionally, the final resolution and temporal sampling for an output media object may be encoded in second visual representation 106.

In another embodiment, an input media object may be audio information. The first information may be audio information for music notes and the second information may be information that is applied to the first information to create the output media object, such as an indication of an instrument. An example of first visual representation 104 may be a picture of music notes recognized from the audio information. An example of second visual representation 106 may be a bar code. First visual representation 104 may be used to generate audio information. For example, the music notes may be captured using music notes recognition or optical character recognition (OCR). Information in the bar code may include, for example, which instruments should be used to play the audio information, the key to play the audio information, etc. Also, second visual representation 106 may be a picture of an instrument that should be used to play the music notes. First and second visual representations 104 and 106 may then be used to construct an output media object that includes audio information for the music notes.

In yet another embodiment, an input media object may be a video or animation of an object. The first information may be information for a wire frame of the object. The second information may be face animation parameters that can be applied to the wire frame to construct an output media object. First visual representation 104 may be a 3-D wire frame of an image. Second visual representation 106 may be a bar code that includes encoded face animation parameters. First visual representation 104 may be an integrated texture map, which is a special image that looks like someone's skin that has been peeled off and laid out flat. Thus, animation information decoded from the bar code may be used to animate the 3-D wire frame into a talking head. Thus, first and second visual representations 104 and 106 may then be used to construct a media object of a talking head.

In another embodiment, an input media object may be an animated video. The first information may be an image of an object segmented from a key frame of the animated video. The second information may be information to apply to the image of the object, such as background information, additional animation information, text. First visual representation 104 may be an image of the object. Second visual representation 106 may be a bar code representation that includes encoded background information, additional animation information, text, etc. First and second visual representations 104 and 106 may then be used to construct an output media object.

A person skilled in the art will recognize other examples of visual representations that can be generated. Also, other examples will be described in more detail below.

Figure 2:
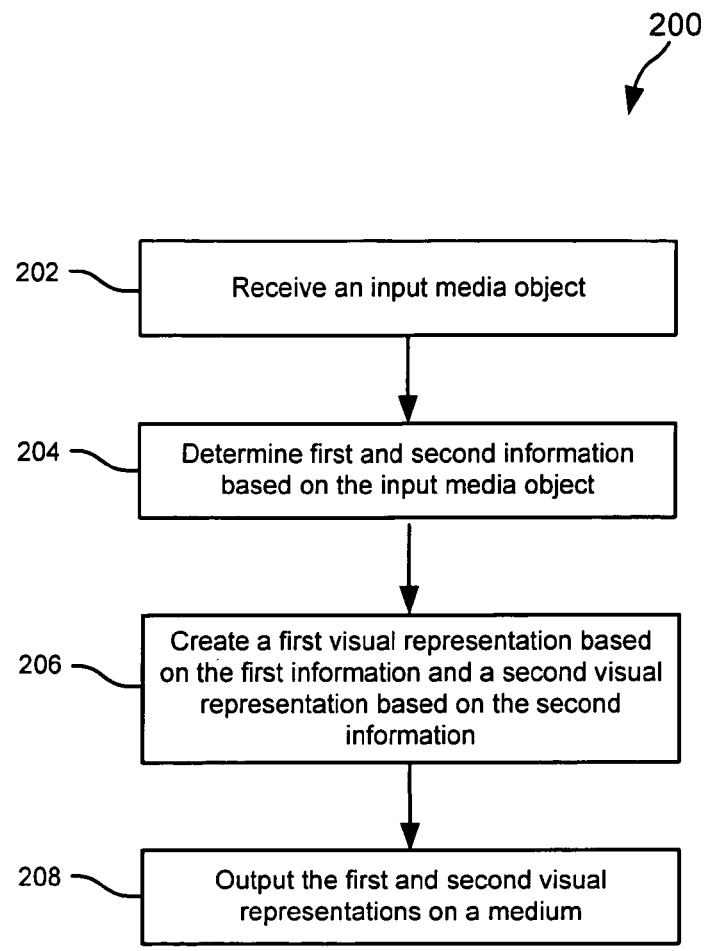
FIG. 2 depicts a simplified flowchart of a method for creating a visual representation according to one embodiment of the present invention.

FIG. 2 depicts a simplified flowchart 200 of a method for creating a visual representation according to one embodiment of the present invention. In step 202, an input media object is received at encoder 102. Although one media object is described as being received, it should be understood that encoder 102 may receive any number of media objects. In one embodiment, information identifying the input media object may be received. For example, a storage location or identifier for the media object is specified by a user. The media object may then be retrieved and received at encoder 102.

In step 204, first and second information are determined from the input media object. The input media object may be analyzed to determine first information. For example, as described above, a reference frame may be determined from the media object. As described above, the second information may be information that may be used to manipulate the first information.

In step 206, first visual representation 104 is created based on the first information and second visual representation 106 is created based on the second information. It should also be understood that any number of visual representations may be created. For example, any number of visual representations may be created from the first information and any number of visual representations may be created from the second information. Also, a single visual representation may be created from both the first and second information.

In step 208, first and second visual representations 104 and 106 are outputted on a medium. In one embodiment, outputting may be printing, storing, etc. For example, first and second visual representations 104 and 106 may be printed on a paper medium. First visual representation 104 may be printed in a first position on the paper medium and second visual representation 106 may be printed in a second position on the paper medium. Additionally, in another embodiment, first and second visual representations 104 and 106 may be stored on an electronic medium. For example, first and second visual representations 104 and 106 may be stored as a JPEG image. A person skilled in the art should appreciate other mediums that may be able to include the visual representations.

First and second visual representations 104 and 106 can be used to construct an output media object. The output media object may be substantially similar to the input media object that is received in step 202. The output media object may not be exactly the same as the input media object received in step 202 because of some information loss, but may be substantially similar. For example, the number of bits that are used to display or print a key frame may be less in the output media object than the input media object because information was lost during the encoding and decoding process. Also, some information may be added to the output medium object. For example, the input media object received in step 202 may include audio and video, but the output media object constructed from the visual representation may include audio, video and text information. The process of generating an output media object will be described in more detail below.

In one embodiment, additional information may be stored on a storage device. The additional information may be used to construct the output media object. For example, information may be decoded from first and second visual representations 104 and 106. This information may be sufficient to construct an output media object. However, if the additional information can be accessed from the storage device, it may be used to construct the output media object. For example, the additional information may include resolution information, text, motion vectors, or any other information that can be applied to first visual representation 104 to create an output media object. The additional information may be information that is not necessary to create an output media object to may improve the quality. For example, the additional information may be used to increase the resolution of the output media object.

Figure 3:
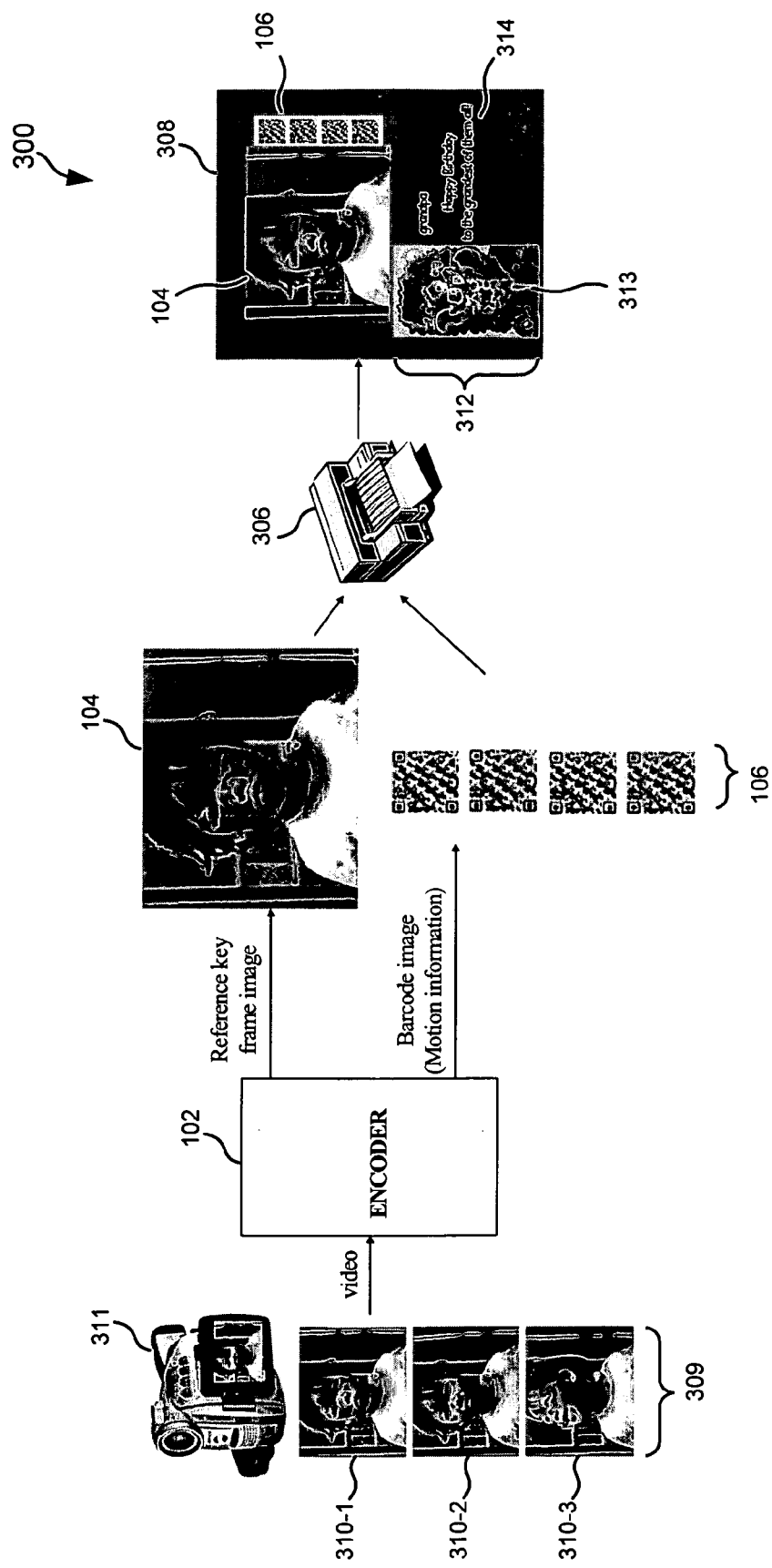
FIG. 3 depicts a system for outputting a visual representation on a medium according to one embodiment of the present invention.

FIG. 3 depicts a system 300 for outputting a visual representation on a medium according to one embodiment of the present invention. As shown, system 300 includes encoder 102, a first visual representation 104, a second visual representation 106, an output device 306, and a medium 308.

As shown, an input media object 309 is received at encoder 102. In one embodiment, input media object 309 is a video that is taken using a video camera 311. The video may be downloaded from video camera 311 to encoder 102 in one embodiment. As shown, the video includes three key frames of video 310-1-310-3.

Encoder 102 is configured to generate first visual representation 104 and second visual representation 106 based on information in media object 309. For example, encoder 102 may determine the first information as information from a key frame image. For example, the first information may be information from first key frame 310-1.

The second information may be motion information determined from media object 309. The motion information may be used to manipulate the first information determined from first key frame 310-1.

In one embodiment, first visual representation 104 is created based on the first information. For example, first visual representation 104 may be an image of key frame 310-1. This may be used as a reference frame.

Second visual representation 106 may be one or more bar code images. A bar code image may include encoded motion information that may be used to manipulate the reference key frame image of first visual representation 104.

First visual representation 104 and second visual representation 106 may then be sent to an output device 306. In one embodiment, output device 306 includes a printer. The printer is configured to print first visual representation 104 and second visual representation 106 on a medium 308, such as paper. It should be understood that other output devices 306 may be used. For example, output device 306 may be a computing device, a copier, etc. that is configured to generate a JPEG or other electronic image from first visual representation 104 and second visual representation 106.

First visual representation 104 is positioned in a first position and second visual representation 106 is positioned in a second position on medium 308. Although they are positioned as shown, it should be recognized that they may be positioned in other positions. For example, different sections of a second visual representation 302 may be positioned around the corners of first visual representation 104. Different ways of positioning first and second visual representations 104 and 106 will be described below.

In addition to first and second visual representations 104 and 106, additional information 312 may be outputted on medium 308. As shown, additional information includes a picture 313 and text 314. Additional information 312 may be determined from media object 309. Also, in another embodiment, additional information 312 may not be determined from media object 309 but may be added from another source. For example, an input may be received indicating that a birthday card should be generated with first and second visual representations 104 and 106. A birthday card template may then be used that includes additional information 312 where first visual representation 104 and second visual representation 106 are added to the template.

Figure 4:
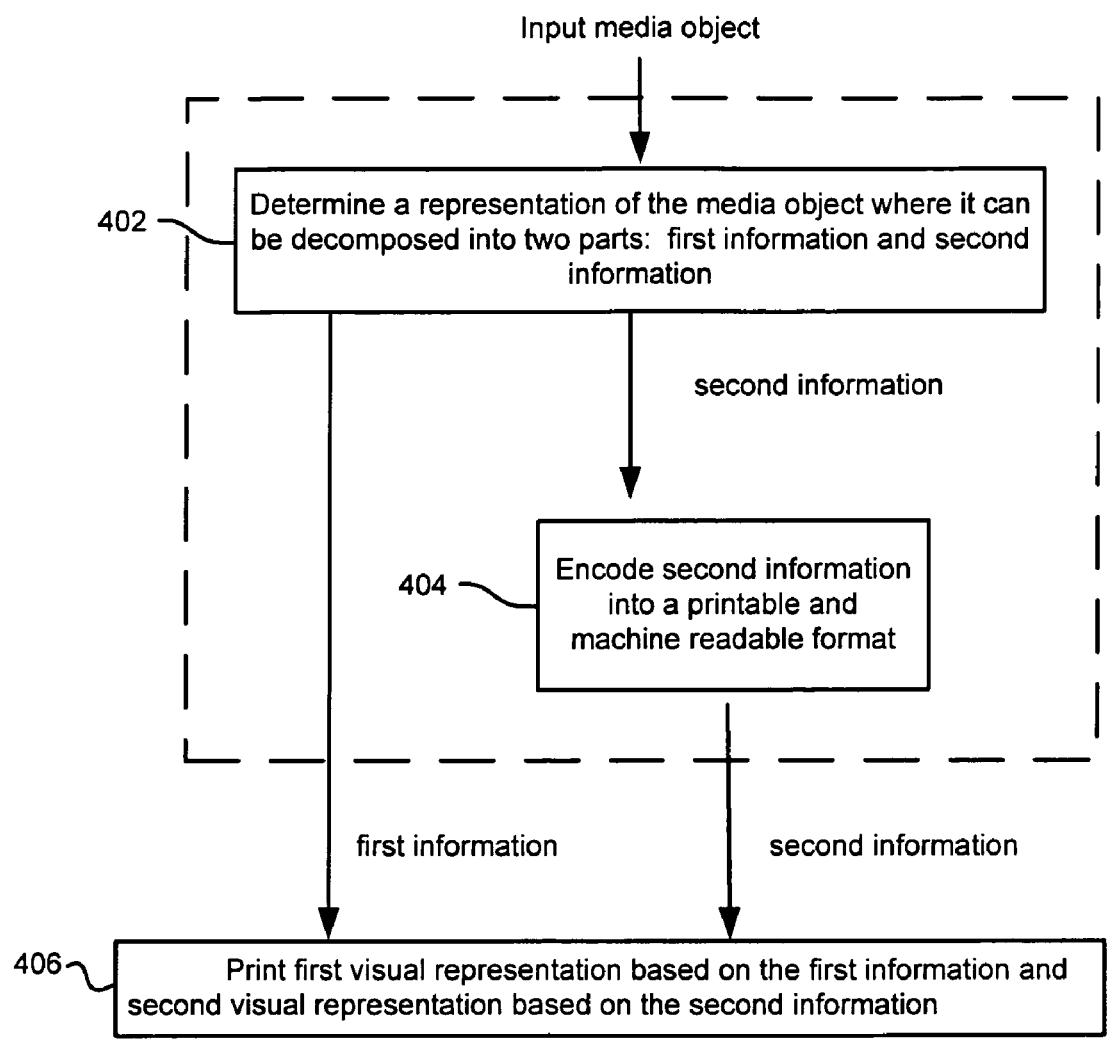
FIG. 4 depicts a simplified flowchart of an encoding process according to one embodiment of the present invention.

FIG. 4 depicts a simplified flowchart of an encoding process according to one embodiment of the present invention. As shown, in step 402, a representation of an input media object is determined where it can be decomposed into two parts: first information and second information. In one embodiment, the first information may be image-based reference information and the second information may be binary side information. The binary side information may be information that is required to construct an output media object using the image-based reference information.

In one embodiment, the first information includes image-based reference information. The image-based reference information can be used to construct a visual representation and thus further encoding may not be needed. The first information may be sent to a printing step as described in step 406. The second information, however, may be binary side information and may require a second encoding step.

In step 404, the second information is encoded into a printable and machine-readable format. For example, second information may be binary information that may be better represented in a printable form as a bar code. Also, the binary information may be represented as other visual representations, such as vector diagrams, numerical characters, etc. In one embodiment, an encoder 102 that may be used in step 404 includes a bar code encoder.

The output of step 404 is a printable and machine-readable format of the second information. A bar code may then be created from the second information. In one embodiment, the bar code is used because it may be represented in a compact form visually. The bar code may be read by a bar code reader and converted into the binary side information.

In step 406, a first visual representation 104 based on the first information and a second visual representation 106 based on the second information are printed. Although printing is described, it will be understood that other methods of outputting the visual representations may be used; for example, a JPEG image or PDF document of the visual representations may be generated.

Figure 5:
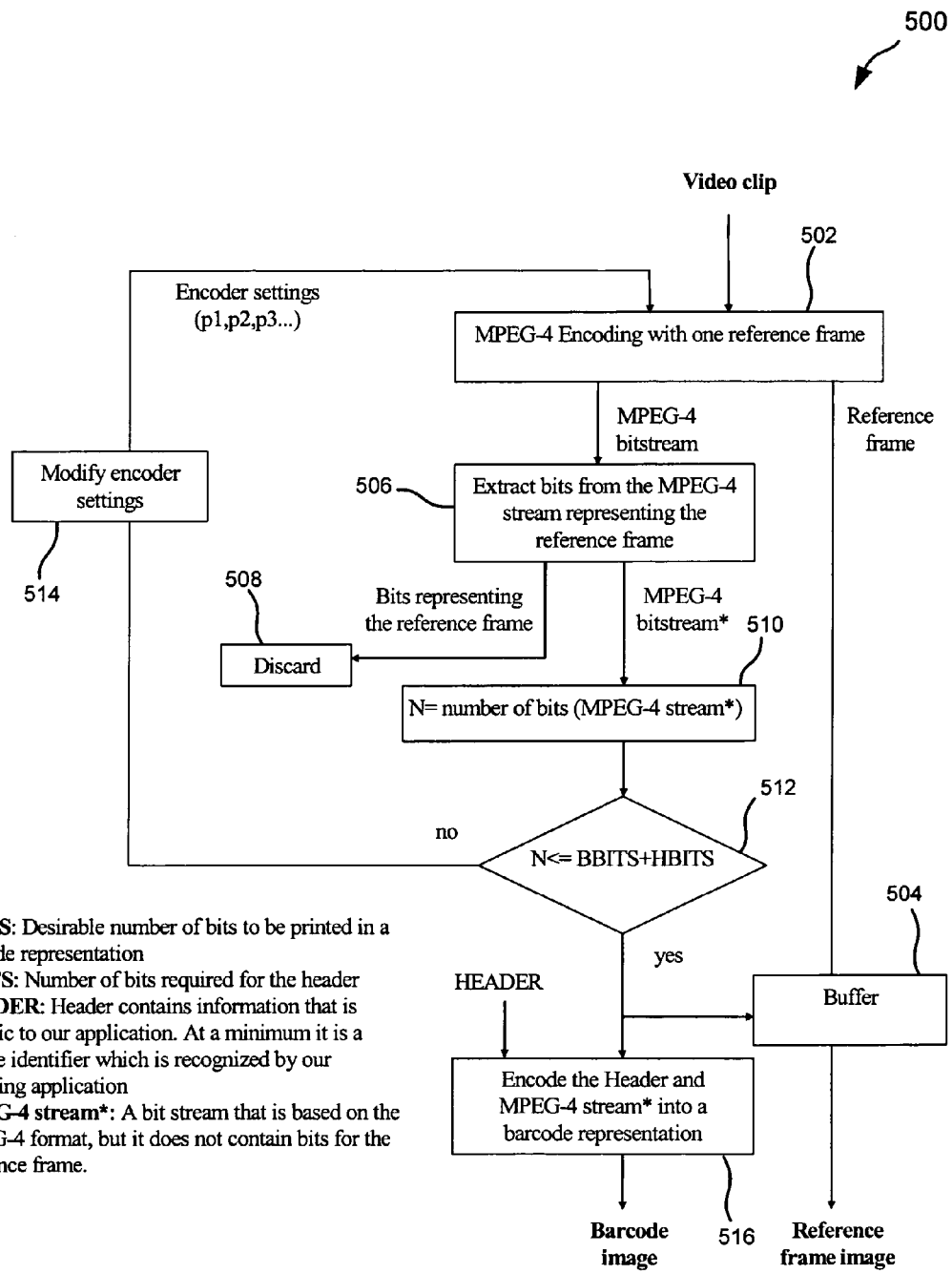
FIG. 5 depicts a simplified flowchart of a method for generating first and second visual representations according to one embodiment of the present invention.

FIG. 5 depicts a simplified flowchart 500 of a method for generating first and second visual representations 104 and 106 according to one embodiment of the present invention. FIG. 5 shows an encoding process where the input media object composed is a frame-based video. The video compression described is motion pictures expert group-4 (MPEG-4); however, it should be understood that other encoding processes may be used, such as MPEG-2, or any other frame-based encoding process.

In step 502, a video clip is received, and MPEG-4 encoding with one reference frame is performed to generate an MPEG-4 bit stream. The MPEG-4 encoding may encode the video clip into an MPEG-4 bit stream. In addition, a reference frame may be determined from the video clip. The reference frame may be determined by different methods. For example, the reference frame may be selected by a user. The user may view the video or select a frame of video that should be used as the reference frame. Also, the first frame of the video may be used. Further, the reference frame may be selected such that the amount of second information that needs to be encoded (e.g., motion vectors, prediction errors, etc.) is minimized. For example, a reference frame may be selected that requires minimal motion to be added to it in order to create an output media object. The selection method may depend on the encoding motion being used (e.g., MPEG-2, flash, etc.).

The encoding outputs an MPEG-4 bit stream and information for a reference frame. The information for the reference frame is then sent to a buffer 504 for later processing. The information for the reference frame may be the first information as described above.

In step 506, bits that represent the reference frame are extracted from the MPEG-4 bit stream. The bits representing the reference frame are then discarded in step 508. The MPEG-4 bit stream without the bits representing the reference frame will herein be referred as the "MPEG-4 bit stream*". The MPEG-4 bit stream* may represent the second information described above. The reference frame bits are discarded because they will be decoded from the visual representation of the reference frame and thus are not needed in the MPEG-4 bit stream*.

In step 510, the number of bits (N) of the MPEG-4 bit stream* is determined. In step 512, it is determined if N is less than or equal to a number of bits. The number of bits may be any number of bits and may be adjusted. For example, the number of bits may be equal to BBITS+HBITS.

BBITS is the desirable number of bits that should be in a visual representation of the MPEG-4 bit stream*. The number of bits in a visual representation may be limited based how much information a second visual representation 106 should include. For example, the number of bits in a visual representation corresponds to the size of the visual representation. Thus, the more bits in a visual representation, the larger the visual representation. Depending on the desired size of the visual representation, BBITS may be adjusted accordingly.

HBITS is the number of bits required for a header. A header includes information that is specific to an application. For example, the header may be a unique identifier that is recognized by a decoder. It should be recognized that the header may not be included in the MPEG-4 bit stream*.

If N is not less than BBITS+HBITS, the process reiterates to step 514, where the encoder settings are modified. The encoder settings may be modified in order to adjust the number of bits found in the MPEG-4 bit stream*. In order to adjust the number of bits, a different reference frame may be determined. For example, the reference frame may chosen such that it includes more information and thus less bits in MPEG-4 bit stream* may be required. If more information is included in the information for the reference frame, then more bits for the reference frame are extracted and discarded from the MPEG-4 bit stream in step 506. The process then reiterates step 502, where the process described above is performed again.

If N is less than or equal to the number of BBITS+HBITS, the process proceeds to step 516, where the header and the MPEG-4 bit stream* are encoded into a visual representation. In one embodiment, a header and MPEG-4 bit stream* may be encoded into a bar code representation. Thus, the output of step 516 is a visual representation of the header and MPEG-4 bit stream*. For example, a bar code image is outputted. A reference frame image of the reference frame information is also outputted from buffer 504. Accordingly, the reference frame image and bar code image is outputted.

Although MPEG-4 encoding is described, it will be understood that other encoding processes may be used. For example, many different encoding schemes and compression algorithms may be employed for reducing the number of bits for representing the motion/animation of a key frame. If a source is natural video, such as television or home video content, a video encoding scheme is optimized for such content may be MPEG-2, MPEG-4, windows media, and MPEG-4 Advanced Video Coding (AVC). These formats may yield fewer bits and may also be more efficiently represented in a bar-code format depending on the media object processed. If a media object is computer graphics, such as greeting cards and animations, then encoding schemes that use MPEG-4 BIFS and flash may yield more efficient representations of first visual representation 104 and second visual representation 106. Moreover, depending on the content, mesh coding, object- and model-based coding, and wavelet-based coding techniques may also be used to generate first and second visual representations 104 and 106.

Figure 6:
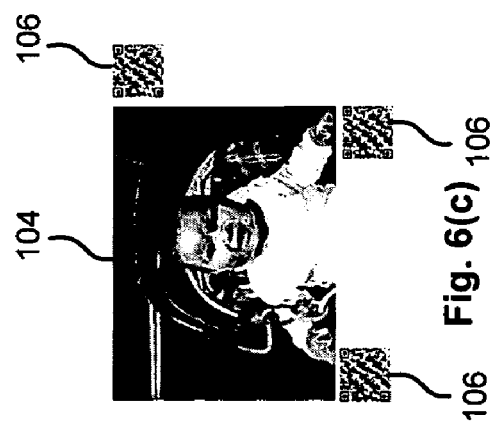
FIG. 6 depicts various layouts for a first visual representation and second visual representation according to one embodiment of the present invention.
Figure 6:
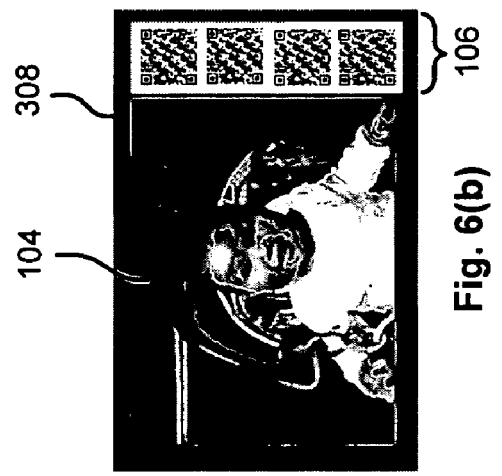
Figure 6:
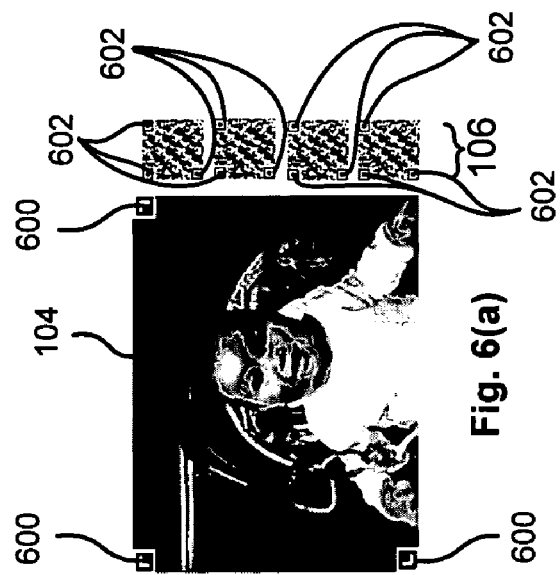

FIG. 6 depicts various layouts for a first visual representation 104 and second visual representation 106 according to one embodiment of the present invention. As shown in FIG. 6A, markers 600 have been placed at various positions of first visual representation 104. In one embodiment, markers 600 are placed at one or more corners of first visual representation 104.

Using markers 600, a decoder may locate first visual representation 104. For example, a medium 308 may be scanned and the boundaries of first visual representation 104 may be located using markers 600. As shown, three markers 600 are placed at the corners of first visual representation 104. If it is assumed that the edges first visual representation 312 are connected at 90° angles from each other, then these markers can be used to locate the boundaries of first visual representation. For example, a square or rectangular area that may be formed using the three markers 600 is the area that includes first visual representation 104.

Also, by placing markers 600 at the corners of a printed first visual representation 104, spatial distortions in a captured image, such as skew and rotation, may be corrected based on markers 600. For example, if a paper medium is scanned by a scanner, the image scanner may be skewed to one side. Using markers 600, the skew of first visual representation 104 may be straightened if it is assumed the boundaries of first visual representation 300 form 90° angles with each other.

Also, markers 602 for second visual representation 106 may denote the boundaries of second visual representation 106. The markers 602 may be used to determine second visual representations 304 as described above. As shown, second visual representation 106 may be separated in sections 304-1, 304-2, and 304-3. Each section 304 may include markers 602. Accordingly, each section may be determined individually. Then, when each section 304 is decoded, the decoded information may be used in constructing an output media object with first visual representation 104.

In FIG. 6B, a chroma key color that borders first visual representation 104 may be outputted on medium 308. For example, the decoder may determine that first and second visual representations 104 and 106 are bordered by the chroma key color. Medium 308 is segmented and first visual representation 104 may be determined based on the fact that it is a rectangular shape with certain dimensions. Also, second visual representation 106 may be determined based on its shape and dimensions.

Also, first visual representation 104 may be determined by encoding a chroma key color into second visual representation 106. A bar code reader may recognize second visual representation 106. The chroma key color may be determined from information decoded from the bar code. A decoder can then locate the image on medium 302 by determining images surrounded by the chroma key color. Spatial distortions may be corrected after segmentation if it is assumed that first visual representation 104 is rectangular in shape. For example, if the image determined is not rectangular in shape, the distortion may be corrected by converting the image to a rectangular shape.

In FIG. 6C, sections of second visual representation 106 may be positioned at certain positions such that first visual representation 104 may be located. For example, different sections of second visual representation 106 may be positioned at corners (e.g., three of four corners) of first visual representation 104. A decoder may use the sections of second visual representation 106 to locate first visual representation 104. For example, the sections may denote a rectangular shape that borders first visual representation 104.

Also, information on the relationship between the sections of second visual representation 106 and first visual representation 104 may be encoded in second visual representation 106. Accordingly, the exact location of first visual representation 104 may be computed based on the encoded information in second visual representation 106. For example, certain coordinates of first visual representation 104 may be encoded into second visual representation 106.

Also, color correction of key frames can be achieved by encoding some color information about first visual representation 104 (such as average color or color histogram) in second visual representation 106 and this information may be used to correct the color of first visual representation 104.

Decoding

Figure 7:
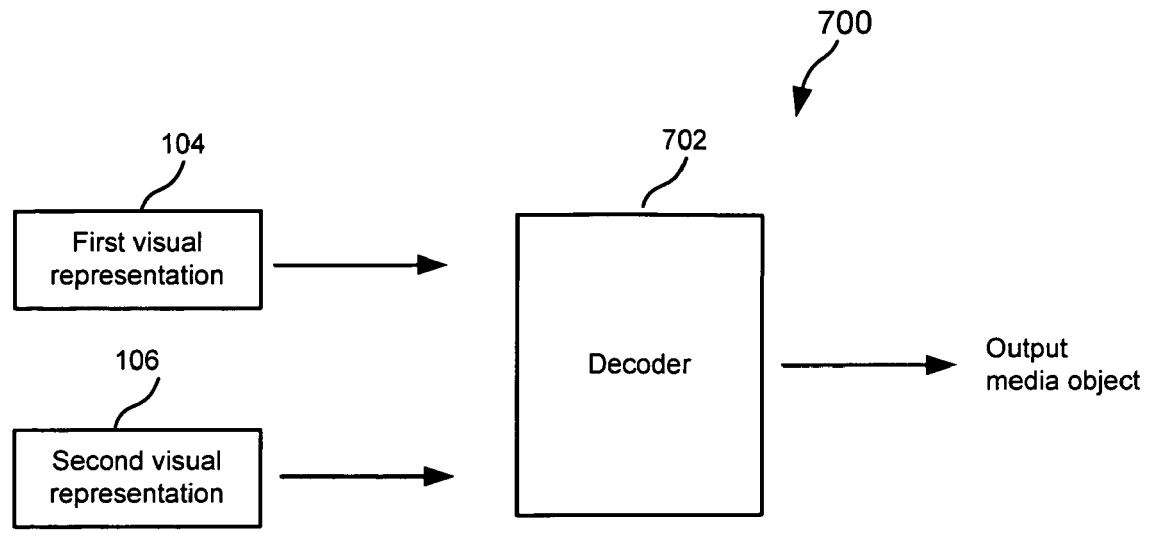
FIG. 7 depicts a system for creating an output media object according to one embodiment of the present invention.

FIG. 7 depicts a system 700 creating an output media object according to one embodiment of the present invention. As shown, the decoder 702 receives a first visual representation 104 and a second visual representation 106 and outputs an output media object. Although first visual representation 104 and a second visual representation 106 are shown, it should be understood that any number of visual representations may be received by decoder 702. Also, any number of media objects may be outputted by decoder 702.

First visual representation 104 and second visual representation 106 may be outputted on a medium, such as a paper or electronic medium. In one embodiment, first visual representation 104 and second visual representation 106 are static images.

First visual representation 104 is generated based on first information. For example, as discussed above, the first information may be determined based on an input media object. In one embodiment, generation of first visual representation 104 is described in the encoding section above.

Second visual representation 106 is generated based on second information. For example, as described above, second information may be determined based on the input media object. In one embodiment, generation of second visual representation 106 is described in the encoding section above.

In one embodiment, decoder 702 may be any decoder configured to decode visual representations to determine information. For example, decoder 702 may use techniques included in an MPEG-4 decoder, flash decoder, an MPEG-2 decoder, text-to-speech converter, a bar code decoder, etc. It should be understood that any combination of these decoders may be used in decoder 702.

Decoder 702 is configured to construct an output media object from first and second visual representations 104 and 106. For example, first visual representation 104 may be a reference image that can be decoded into image-based reference information. Second visual representation 106 may be decoded in order to determine manipulation or motion information for the image-based reference information. Using the manipulation information, the output media object is created in that the image-based reference information is manipulated over time using the manipulation information.

Accordingly, first and second visual representations 104 and 106 are received and an output media object is constructed by decoder 702. The output media object may be any object that includes time variant information, such as multimedia information. For example, the output media object may include any combination of text information, graphics information, animation information, sound (audio) information, video information, and the like.

Figure 8:
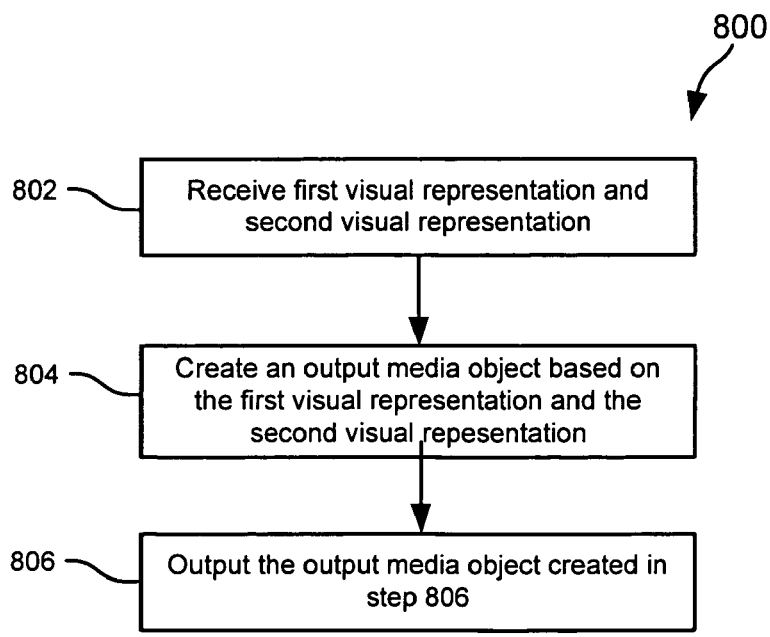
FIG. 8 depicts a simplified flowchart of a method for creating an output media object according to one embodiment of the present invention.

FIG. 8 depicts a simplified flowchart 800 of a method for creating an output media object according to one embodiment of the present invention. In step 802, first and second visual representations 104 and 106 are received from a capture device. The capture device determines first visual representation 104 and second visual representation 106 from a medium 308. For example, the capture device is configured to locate first visual representation 104 and second visual representation 104 on medium 308 and send it to decoder 702, which may be part of or separate from the capture device. Techniques for locating first and second visual representations 104 and 106 will be described below.

In step 804, an output media object is created based on first visual representation 104 and second visual representation 106. In one embodiment, first visual representation 104 may be decoded into image-based reference information. Manipulation information decoded from second visual representation 106 is then used to manipulate the image-based reference information to create the output media object.

In step 806, the output media object created in step 804 is outputted. For example, the output media object may be outputted for display to a display device, such as a cell phone, computer, personal and digital assistant (PDA), television, etc. Also, the output media object may be stored in a storage device.

Accordingly, an output media object may be created from first visual representation 104 and second visual representation 106. In one embodiment, the output media object includes time variant information, such as multimedia information. Thus, a static visual representation may be used to create an output media object that includes time variant information.

Figure 9:
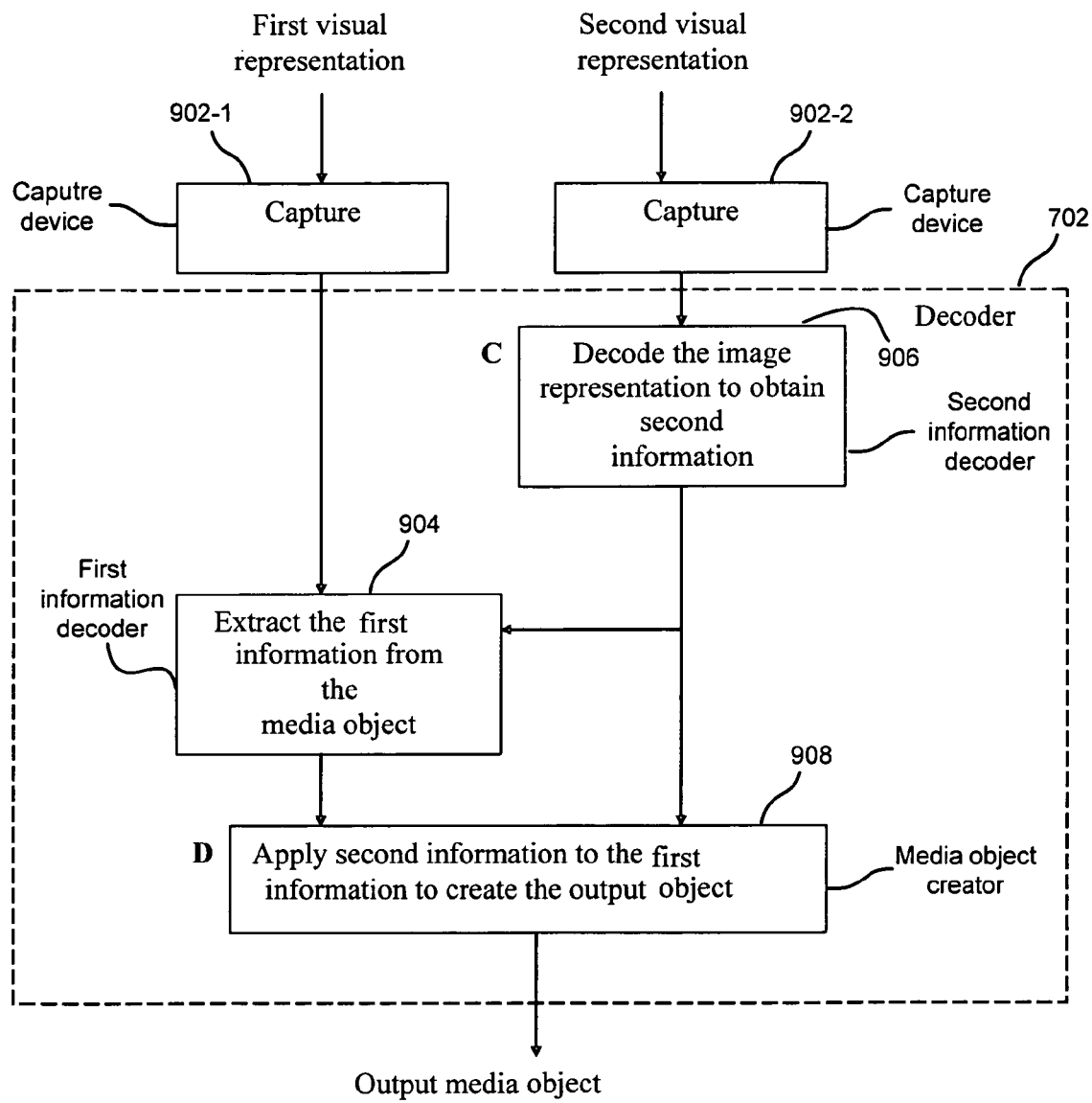
FIG. 9 depicts a simplified block diagram of a system for creating an output media object according to one embodiment of the present invention.

FIG. 9 depicts a simplified block diagram of a system for creating an output media object according to one embodiment of the present invention. As shown, capture devices 902-1 and 902-2 capture a first visual representation 104 and a second visual representation 106. Capture device 902-1 then sends first visual representation 104 to a first information decoder 904 and capture device 902-2 sends second visual representation 106 to a second information decoder 906. Although separate capture devices 902-1 and 902-2 are shown, it should be understood that capture devices 902 may be the same capture device or different capture devices. Also, decoder 702 may be separate from or included in capture devices 902-1 and 902-2.

Second information decoder 906 is then configured to decode second visual representation 106 to determine second information that is encoded in second visual representation 106. Second information decoder 906 is configured to receive second visual representation 106 from capture device 902-2. Second visual representation 106 is then analyzed and decoded. For example, second visual representation 106 may be a bar code that has second information encoded in it. The second information is then decoded from the bar code. The second information is then sent to first information decoder 904 and a media object creator 908.

First information decoder 904 is configured to determine first information that is encoded in first visual representation 104. First information decoder 904 receives first visual representation 104 from capture device 902-1 and the second information from second information decoder 906. For example, first information decoder 904 may determine image-based reference information based on first visual representation 104 and information found in the second information received from second information decoder 906. In one embodiment, first visual representation 104 may be an image of a key frame. The second information may then be used to adjust features of the image. For example, second visual representation 106 may be cropped, scaled, deskewed, etc.

Media object creator 908 is configured to create an output media object. Media object creator 908 receives the first information and the second information. The second information is applied to the first information in order to create an output media object. For example, manipulation information may be applied to the image-based reference information in order to create the output media object. For example, a full motion video clip may be created using bits from the first and second information. The output media object is then outputted by decoder 702.

The output media object may then be played by an output device. For example, a video may be played by a computing device, such as a cell phone, computer, etc. Also, the output media object may be stored in storage for later playing.

In one embodiment, the output media object is created by decoder 702 without accessing a server or any other storage device. Accordingly, the output media object is created using information decoded from first and second visual representations 104 and 106 that are found on a medium, such as a paper medium. Thus, a static image may be used to create an output media object without requiring any additional information.

Although the output media object may be created without additional information received from sources other than first and second visual representations 104 and 106, it should be understood that additional information may be used in creating an output media object. For example, information stored in a storage device may be used. The information may be obtained from the storage device over a network, if possible. For example, decoder 702 may attempt to access additional information from the storage device. If it is not possible, the output media object may be created from the first and second visual representations 104 and 106. If it is possible to access addition information, the additional information may be accessed and used to construct the output media object.

In one embodiment, information in first or second visual representation 104 or 106 may be used to determine if additional information should be used and/or the location of the information. A URL may be encoded in second visual representation 100, for example. The additional information may be accessed and used to improve the construction of the media object. For example, the resolution may be improved using the additional information. Also, captions, titles, graphics, etc., may be added to the output media object using the additional information.

Figure 10:
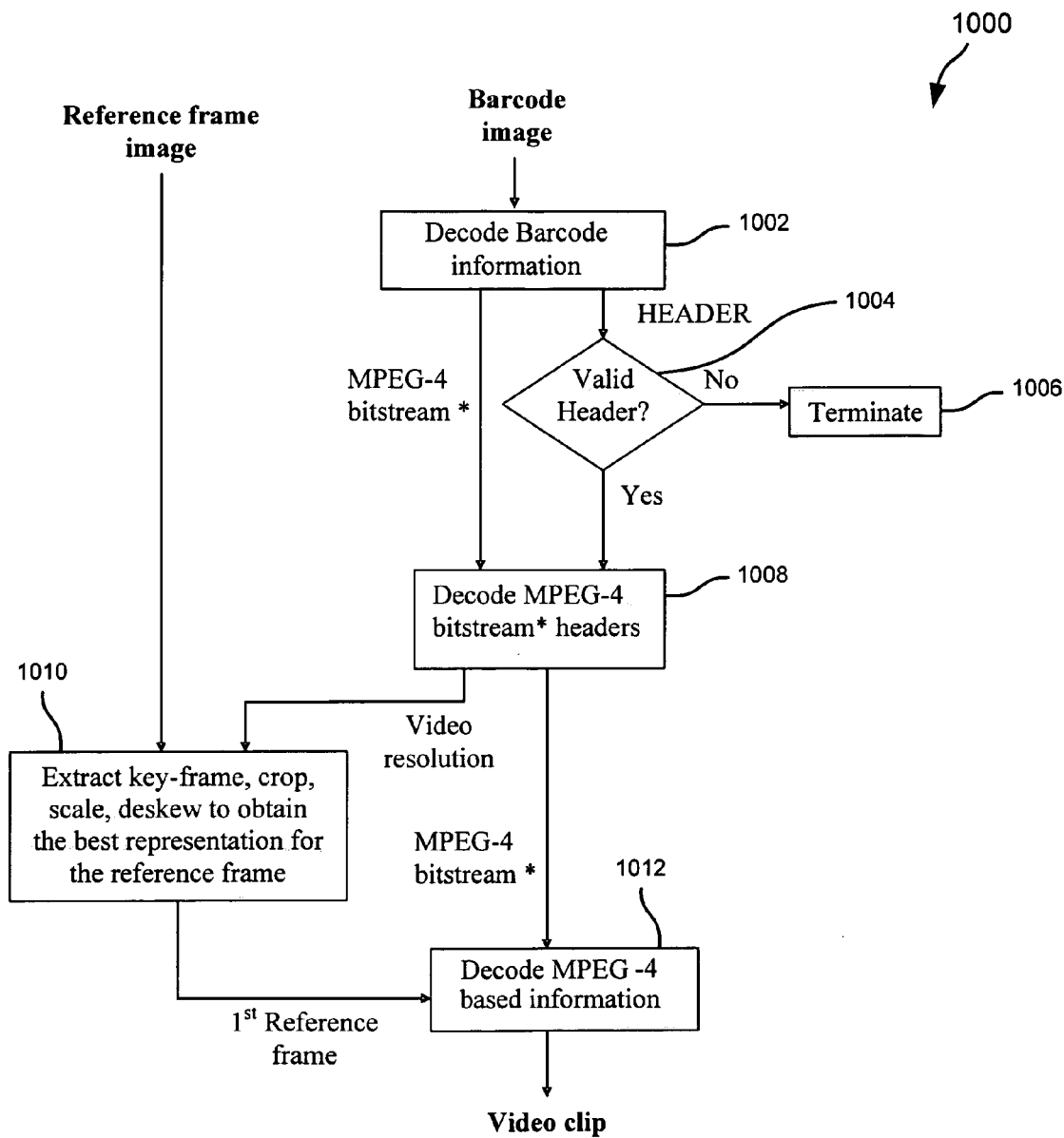
FIG. 10 depicts a simplified flowchart for decoding and creating an output media object according to one embodiment of the present invention.

FIG. 10 depicts a simplified flowchart 1000 for decoding and creating an output media object according to one embodiment of the present invention. In one embodiment, the output media object includes a frame-based video.

In step 1002, a bar code image (e.g., the second visual representation) is decoded. The bar code may be decoded using methods well known in the art. The decoded bar code image yields a header and an MPEG-4 bit stream* in one embodiment. A header includes information that is specific to an application. For example, the header includes a unique identifier. The identifier may be used to determine information about the barcode image. For example, the header may describe what kind of information was encoded (e.g., audio with MP3 compression, video with MPEG-4 compression). The decoder may have the header information to determine an application to use for generating the media object. An MPEG-4 bit stream* includes a bit stream that is based on an MPEG-4 format. The MPEG-4 bit stream*, in one embodiment, does not include bits for a reference frame representation, which is described below. Although a MPEG-4 format is described, it should be understood that any format may be used, such as MPEG-2, flash, etc.

In step 1004, it is determined if a valid header is received from step 1002. For example, the header may identify which application to use. If the application is not supported, then the header may be deemed invalid. If a valid header is not received, then, in step 1006, the decoding process is terminated. If a valid header is received, the process proceeds to step 1008, where MPEG-4 bit stream headers are decoded. The MPEG-4 bit stream headers may include resolution information, quantization parameters, etc.

In step 1010, a reference frame image (e.g., a first visual representation) is received and a reference frame representation is determined. In determining a reference frame representation, in one embodiment, a key frame is extracted from the reference frame image and is cropped, scaled, de-skewed, etc. to obtain the reference frame representation. Resolution information that may be used to generate a reference frame representation may be determined from the MPEG-4 bit stream*. The resolution information may be used to crop, scale, de-skew, etc. the reference frame image.

In step 1012, MPEG-4 based decoding is then performed. In one embodiment, an MPEG-4-based decoder is implemented based on an MPEG-4 specification. The reference frame representation is received at an MPEG-4-based decoder along with the MPEG-4 bit stream*. One difference from the MPEG-4 specification is that the MPEG-4-based decoder is configured to decode an MPEG-4 bit stream* that does not include bits from the reference frame representation. Rather, the bits from the reference frame representation are combined with the decoded MPEG-4 bit stream*. The combination creates a frame-based video. The MPEG-4-based decoder then outputs the created frame-based video.

The video clip may then be played by an output device. For example, a video may be played by a computing device, such as a cell phone, computer, etc. Also, the output media object may be stored in storage for later playing.

Figure 11:
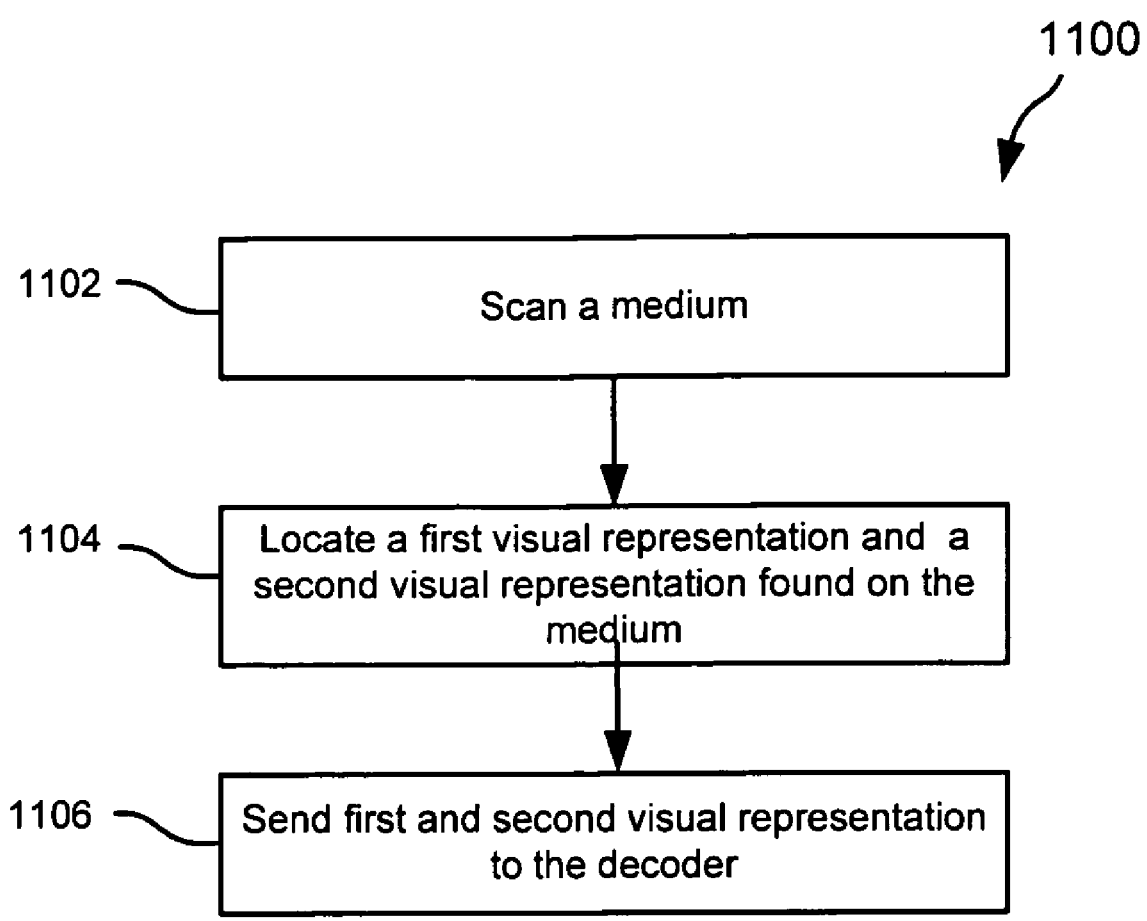
FIG. 11 depicts a simplified flowchart of a method for determining first and second visual representations found on a medium according to one embodiment of the present invention.

FIG. 11 depicts a simplified flowchart 1100 of a method for determining first and second visual representations 104 and 106 on a medium 308 according to one embodiment of the present invention. In step 1102, an image of a medium 308 is captured by a capture device. The capture device may include any devices capable of capturing an image, such as a cell phone, PDA, scanner, printer, copier, camera, etc. In one embodiment, the image may be captured by a scanner. For example, a paper medium 308 may be scanned by a scanner or captured by a digital camera. Also, an image being displayed from an electronic image such as a PDF, JPEG, etc., image file may be captured. For example, a picture of a device displaying first visual representation 104 and second visual representation 106 may be taken. Also, an electronic image file may be captured without physically scanning a medium. For example, an electronic image file may be received by the capture device. A person skilled in the art should appreciate other methods of capturing first and second visual representations 104 and 106.

In step 1104, first visual representation 104 and second visual representation 106 are located on the image of medium 308. For example, markers may have been placed at certain positions on medium 308, such as at one or more corners of first visual representation 104 and second visual representation 106. These markers may be located by the capture device and used to determine the location of second visual representation 106 or first visual representation 104. In addition, second visual representation 106 may be found at positions around the borders of first visual representation 104 and used to locate first visual representation 104. Also, information in the second visual representation 106 may be used to determine a location of a first visual representation.

Dimensions may be also used to determine first and second visual representations 104 and 106. For example, a capture device may know the approximate dimensions for first and second visual representations 104 and 106. A chroma key background may be included where the borders of images may be determined. The dimensions of the images may then be analyzed to determine which images fit the dimensions specified for first and second visual representations 104 and 106.

In step 1106, the located first and second visual representations 104 and 106 are sent to a decoder 702.

Figure 12:
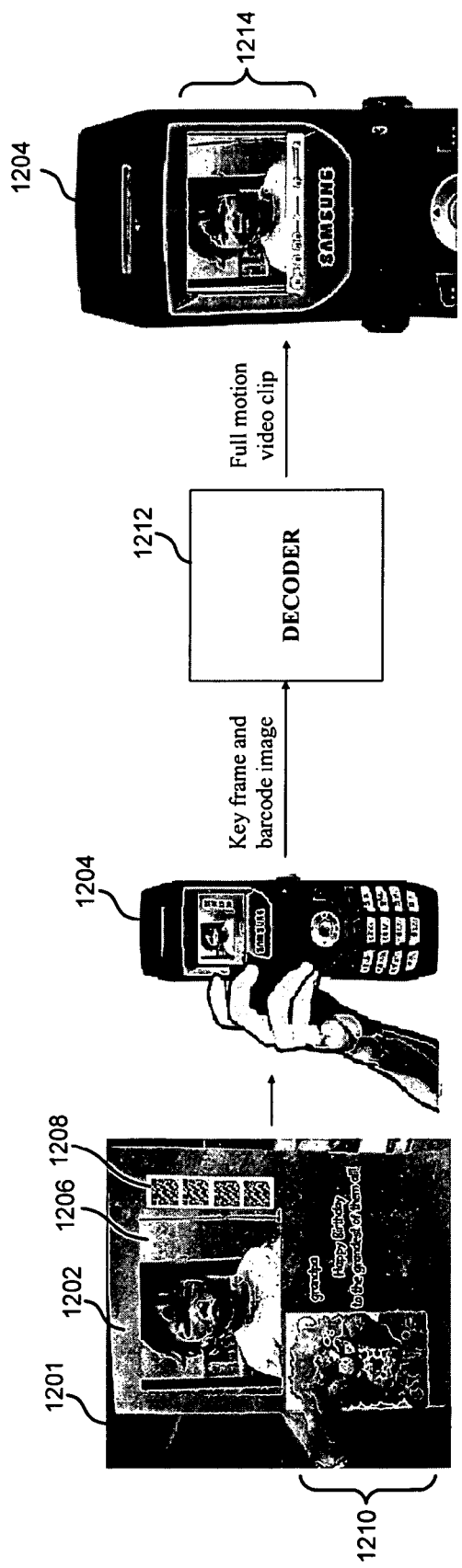
FIG. 12 depicts the rendering of a printed key frame with motion encoded in a bar code as an output media object according to one embodiment of the present invention.

Examples of output media objects that may be constructed will now be described. FIG. 12 depicts the rendering of a printed key frame with motion encoded in a bar code as an output media object according to one embodiment of the present invention. As shown, an image 1201 of paper medium 1202 may be captured by a device 1204. For example, device 1204 may take a photograph of medium 1202. In one embodiment, device 1204 may be a cellular phone; however, it should be recognized that devices 1204 may be any other devices capable of capturing an image of paper medium 1202.

First visual representation 1206 and a second visual representation 1208 are outputted on medium 1202. For example, first visual representation 1206 and a second visual representation 1208 may be printed on a paper medium 1202 or stored in an electronic storage medium 1202. Additional information 1210 is outputted on medium 1202. Additional information 1210 includes text and a picture for a card.

Capture device 1204 is configured to determine first visual representation 1206 and second visual representation 1208 from image 1201 of medium 1202. First visual representation 1206 and second visual representation 1208 may be located on medium 1202 using processes described above. First visual representation 1206 and second visual representation 1208 are then sent to decoder 1212.

A decoder 1212 may be included in device 1204. Decoder 1212 receives a key frame and bar code image and generates an output media object using the key frame and bar code image. In one embodiment, the bar code includes motion information that is applied to the key frame in order to construct a full motion video clip.

The output media object is then outputted on a display 1214 of device 1204. As shown, display 1214 includes an interface that is configured to play the output media object. The output media object includes time variant information that is displayed over time on display 1214. For example, a video clip is played back on device 1204.

Figure 13:
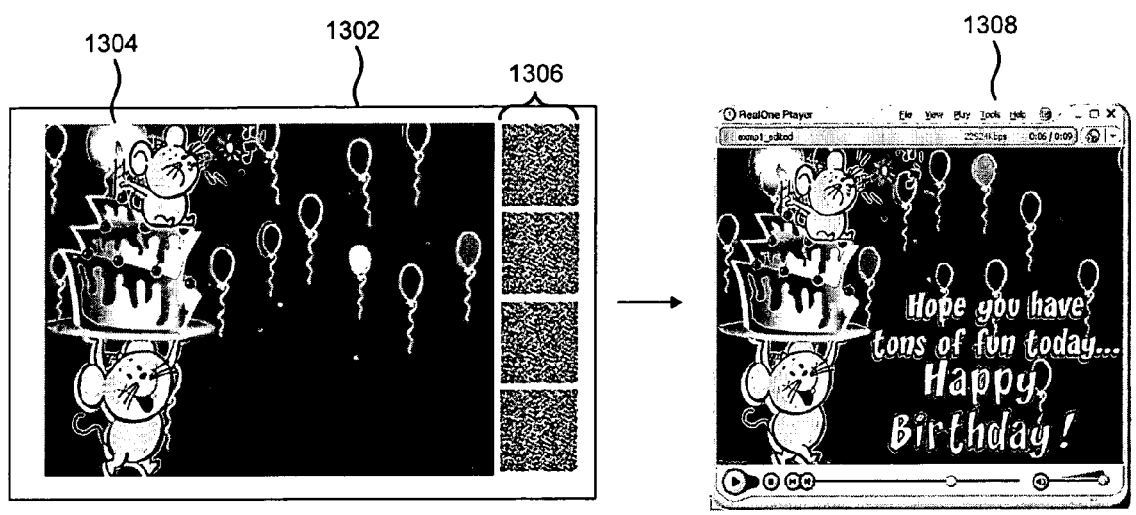
FIG. 13 depicts an example of a greeting card that may be used to generate an output media object according to one embodiment of the present invention.

FIG. 13 depicts an example of a greeting card that may be used to generate an output media object according to one embodiment of the present invention. As shown, a greeting card is displayed on a medium 1302. In one embodiment, medium 1302 may be paper, electronic, etc. For example, the greeting card may be a paper card or an electronic card.

A first visual representation 1304 and a second visual representation 1306 are shown on medium 1302. First visual representation 1304 and second visual representation 1306 may be located on medium 1302 using processes described above. They may then be decoded into an output media object. In one embodiment, first visual representation 1304 may be a key frame and second visual representation 1306 may be a bar code. Second visual representation 1304 may be decoded into second information that includes manipulation information, such as global motion vectors, text messages, fonts, motion information, etc. The manipulation information may be used to manipulate the key frame to generate an output media object.

An interface 1308 may be used to play back the output media object. For example, a video includes an image that is included in first visual representation 1304 and over time, additional information is applied to the image. For example, text information of "Hope you have tons of fun today . . . Happy Birthday!" and moving balloons are included in the video.

Figure 14:
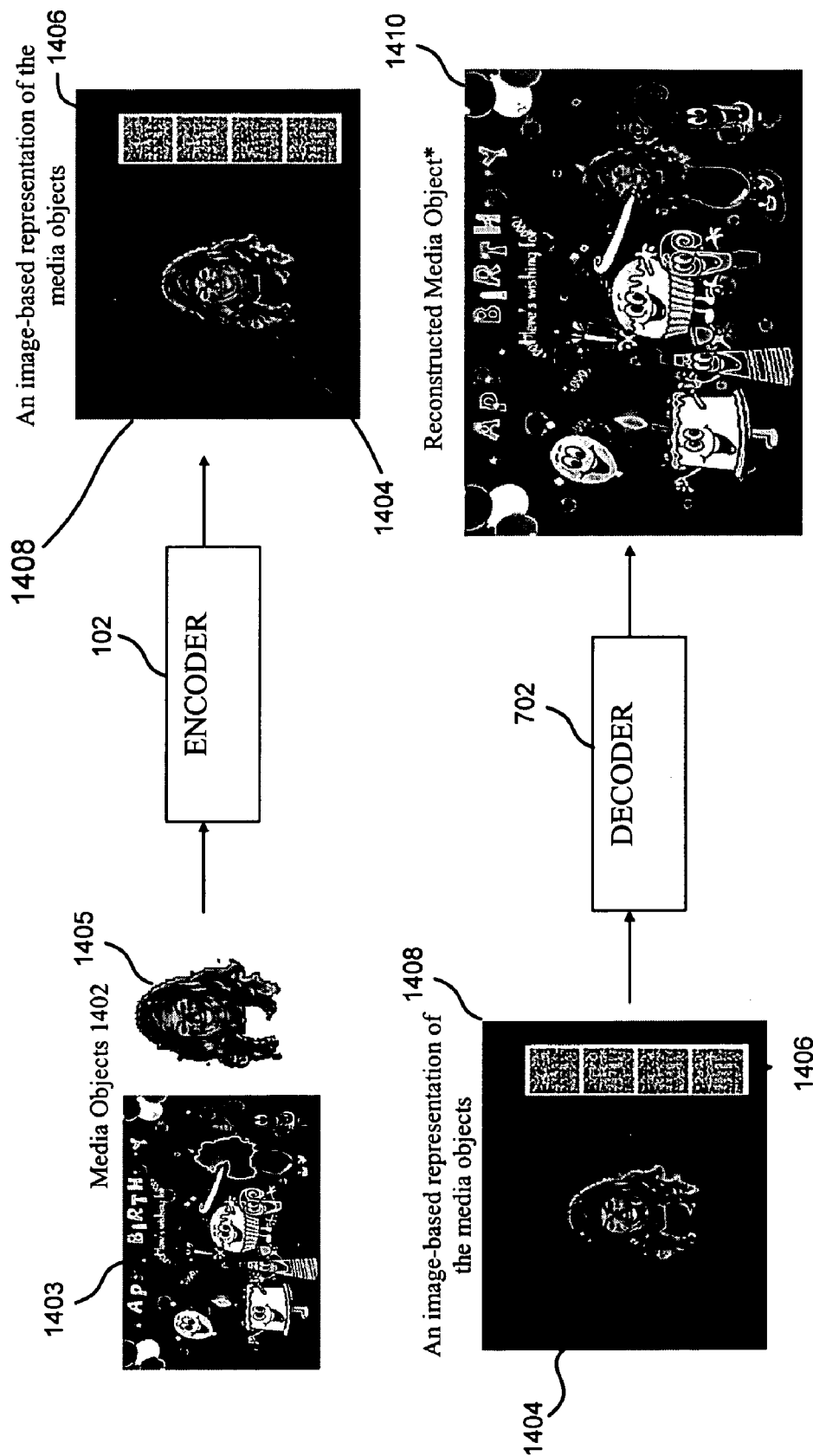
FIG. 14 depicts inputs and outputs of an encoder and decoder in an example of a chroma keying application according to one embodiment of the present invention.

FIG. 14 depicts inputs and outputs of a decoder 702 and encoder 102 in an example of a chroma keying application according to one embodiment of the present invention. Media objects 1402 may be received at encoder 102. Media objects 1402 include an image of a scene 1403 with a person's facial image 1405 segmented from the scene.

Encoder 102 is configured to generate a first visual representation 1404 and a second visual representation 1406. First visual representation 1404 may be the person's facial image 1405, and information from scene 1403 may be encoded in second visual representation 1406. The information from the scene may be background information, additional information, text, etc. First visual representation 1404 and second visual representation 1406 are then outputted on a medium 1408. For example, first visual representation 1404 and second visual representation 1406 may be printed on a paper medium 1408 or stored on an electronic storage medium 1406.

First visual representation 1404 and second visual representation 1406 may be located by a capture device. For example, first and second visual representations 1404 and 1406 may be determined by separating images that are bordered by the background color. First visual representation 1404 and second visual representation 1406 may be separated by a background color on medium 1406. The capture device may then be configured to recognize second visual representation 106. Information in second visual representation 106 may include the background color. The capture device then segments first visual representation 102 from the background color.

A decoder 702 receives first visual representation 1404 and second visual representation 1406 and is configured to generate an output media object. The information encoded in second visual representation 1406 may then be used with first visual representation 1404 to generate a reference image. Other information decoded from second visual representation 1406 may then be used to add additional animation, text, etc., to the reference image.

Figure 15:
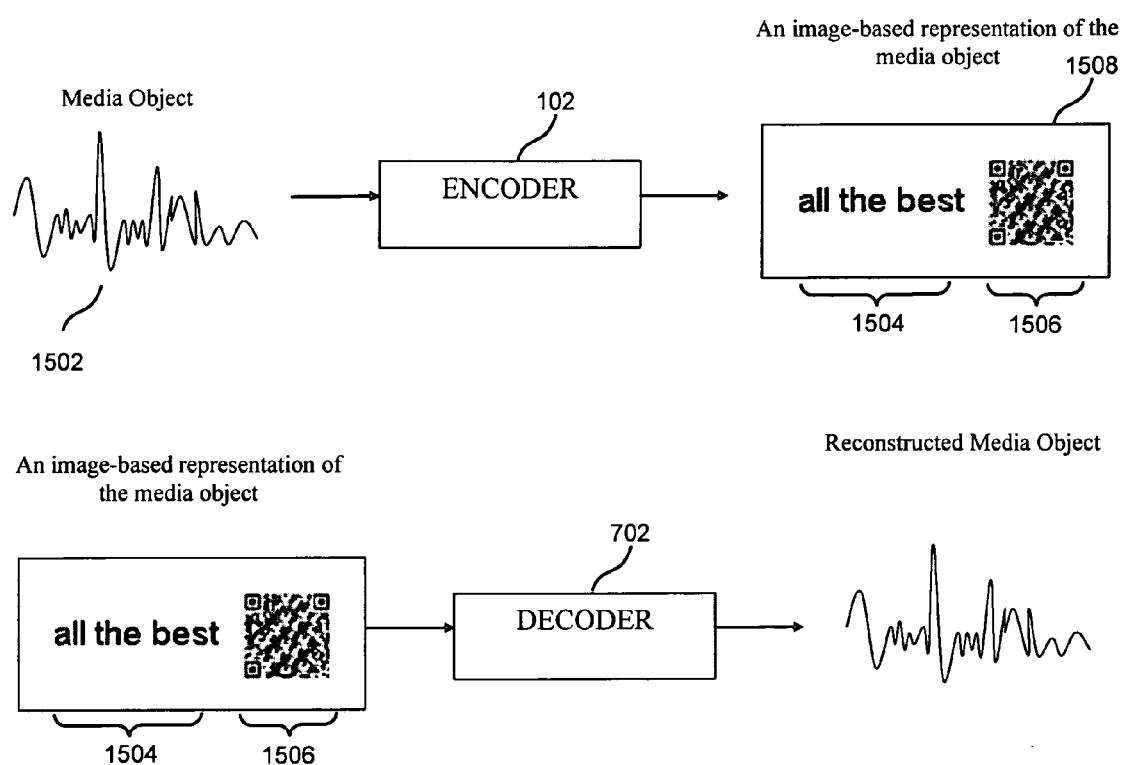
FIG. 15 depicts inputs and outputs of an encoder and decoder for creating an output media object that includes audio information according to one embodiment of the present invention.

FIG. 15 depicts inputs and outputs of an encoder 102 and decoder 702 for creating an output media object that includes audio information according to one embodiment of the present invention. An input media object 1502 may be audio information that is encoded by an encoder 102 into a first visual representation 1504 and a second visual representation 1506. The audio information may be a standard or proprietary audio format, such as MPEG. In one embodiment, encoder 102 converts the audio to text using a speech-to-text converter.

Also, parameters for the audio information may be encoded as a second visual representation 1506. For example, the parameters may be used to enhance the performance of a synthesizer at a decoder 702. Additionally, some text information from input media object 1502 may be encoded in second visual representation 1506.

As shown, first visual representation 1504 and second visual representation 1506 are outputted on a medium 1508, such as being printed on a paper medium. In a decoding process, an image of medium 1508 is captured and visual representation 1504 and second visual representation 1506 are determined from medium 1508.

Decoder 702 receives first visual representation 1504 and second visual representation 1506 and generates an output media object. In one embodiment, the text in first visual representation 1504 is recognized using OCR and synthesizers convert the text to audio information speech. The audio information may be constructed using additional parameters encoded in second visual representation 1506. For example, the pitch of the audio, speed, etc. may be adjusted using the parameters. Accordingly, a speech may be regenerated using visual representations 1504 and 1506 found on medium 1508.

Figure 16:
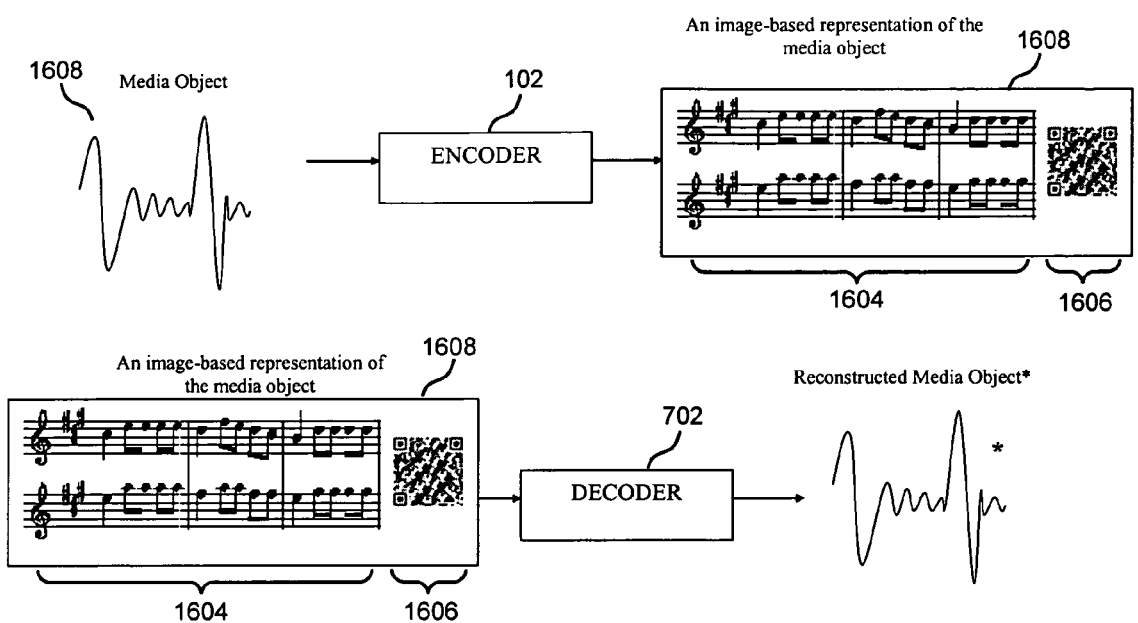
FIG. 16 depicts inputs and outputs for an encoder and decoder for constructing music audio according to one embodiment of the present invention.

FIG. 16 depicts inputs and outputs for an encoder 102 and decoder 702 for constructing music audio according to one embodiment of the present invention. In one embodiment, an input media object 1602 in form of music audio is received at encoder 102. Encoder 102 creates a first visual representation 1604 and a second visual representation 1606 from input media object 1602. In one embodiment, first visual representation 1604 includes music notes that correspond to the music audio being played in media object 1602. Second visual representation 1606 may be a bar code that includes which instruments play the notes found in first visual representation 1604. In addition, other parameters that may be used to play the notes found in first visual representation 1604 may be encoded in second visual representation 1606, such as a pitch, a key, etc. As shown, first visual representation 1604 and second visual representation 1606 are outputted on a medium 1608, such as being printed a paper medium.

In a decoding process, first visual representation 1604 and second visual representation 1606 are then determined from medium 1608. In one embodiment, the music notes found in first visual representation 1604 are recognized using OCR. Decoded information from second visual representation 1606 is then used to construct audio for the music notes. For example, a synthesizer constructs music audio using an instrument specified by parameters decoded from second visual representation 1606. An output media object 1604 includes music audio of the instrument playing the music notes recognized.

Figure 17:
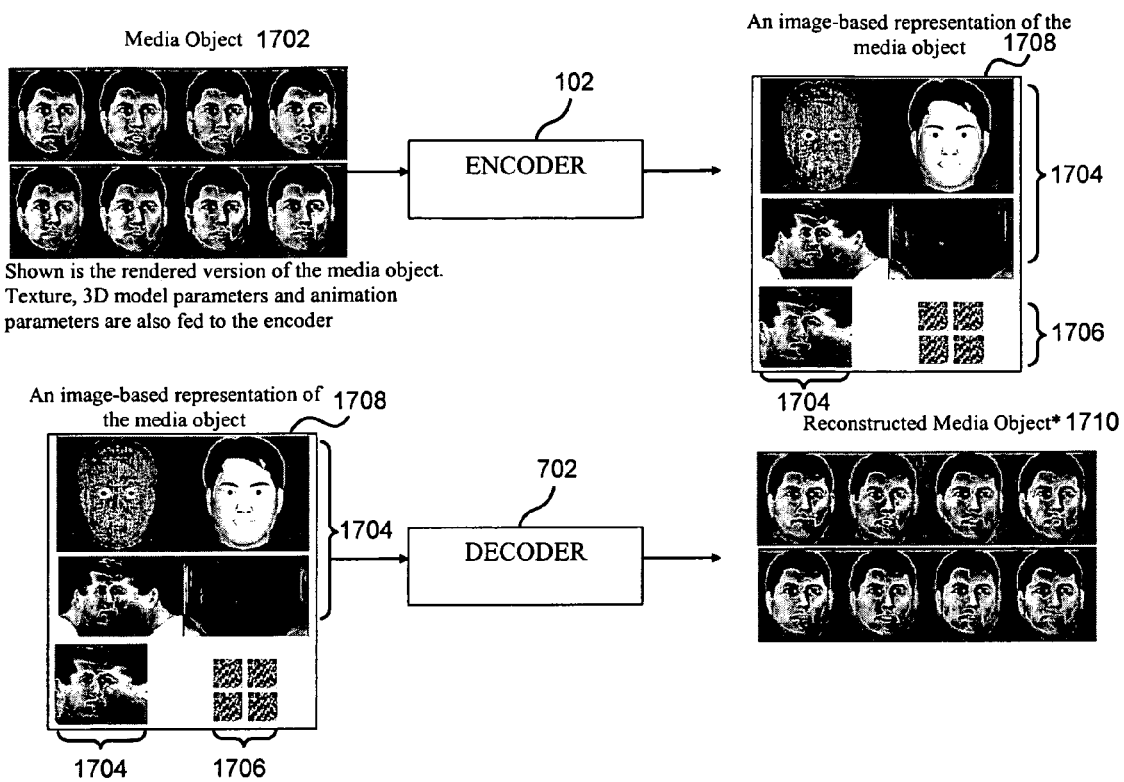
FIG. 17 depicts a synthetic coding application according to one embodiment of the present invention.

FIG. 17 depicts a synthetic coding application according to one embodiment of the present invention. As shown, a media object 1702 that includes a talking head is received at an encoder 102. Encoder 102 creates a first visual representation 1704 and a second visual representation 1706 based on information in input media object 1702. In one embodiment, the human talking head is encoded using texture mapping of the image of the head onto a 3-D wire frame. The integrated texture map, which is a special image that looks like a person's skin has been pealed off and laid flat, can be used as first visual representation 1704. Additionally, other information, such as face animation parameters, may be encoded in second visual representation 1706. First visual representation 1704 and second visual representation 1706 may then be included on a medium 1708, such as being printed on a paper medium.

In a decoding process, first visual representation 1704 and second visual representation 1706 may then be determined from medium 1708. Decoder 702 receives first visual representation 1704 and second visual representation 1706 and outputs an output media object 1710. For example, output media object 1710 may include a talking face.

Other applications that may be performed by embodiments of the present invention may include a multifunction product (MFP) application, such as an application found on a multifunction copier. In one embodiment, a sheet of paper is scanned on an MFP and playback animation/video is enabled without accessing a server or any storage. Also, a sheet of paper may be scanned on an MFP and the rendered video may be copied to e.g., an MPEG, AVI, or other electronic medium (e.g., CD). Additionally, a sheet of paper may be scanned on an MFP and an output media object may be created with more or less key frames than an input media object that was used to create a first visual representation and a second visual representation.

A motion printer may also be enabled. A printer that is capable of receiving video as input, determining a first visual representation and a second visual representation, and printing a first visual representation and a second visual representation may be used. For example, the printer may take a video as input, determine a reference frame and manipulation information for the animation of the key frames, convert the manipulation information to a bar code representation, and then print the reference frame and bar code on paper. The reference frame and bar code may then be used by a decoder to create an output media object.

Product animations/videos may also be enabled. Simple animations/videos can be printed on product boxes, cans, etc. For example, the product boxes, cans, may include a first visual representation and a second visual representation. The first and second visual representations may be used to create an output media object. The output media object may be an animation/video that can illustrate how the product should be used or indicate if a prize is won.

A video album may also be enabled. A printed album may include a first visual representation and a second visual representation of an input media object. For example, a printed object may include a reference image and manipulation information that can be used to generate small video clips. Then, a user may use the video album to generate small video clips instead of viewing static pictures.

In another embodiment, a photo booth application may be enabled. For example, a photo booth may be able to take a video and print a visual representation that includes a first visual representation and a second visual representation on a medium as described above. An output media object may then be created from the visual representation.

In another embodiment, a key frame rendering application may be provided. A key frame representation may be printed on a medium, such as paper, with or without a second visual representation. Accordingly, photo booths may output static images that may be used to create video clips. A key frame representation may include multiple key frames. The key frame may represent a key frame of successive frames in a motion video. When the key frame representation is captured, a decoder can extract, resample, and render the key frames like a motion video in an output media object. Also, if a second visual representation is included, information included in second visual representation 106 may be used to adjust a final resolution or a temporal sampling rate of the key frames.

In another embodiment, scalable messages can be provided. For example, second information may be determined from an input media object. Part of the second information may be printed on a medium in the form of a second visual representation and part of the second information may be accessible from a server or a storage device. During decoding, if a server or storage device is not available, the second information decoded from second visual representation 106 obtained from the medium may be used. If additional information is available from storage or a server, that information may be used to enhance a rendering of an output media object.

Accordingly, embodiments of the present invention use a first visual representation and a second visual representation to construct an output media object. Thus, information may be outputted on a medium, such as a paper medium, and used to construct the output media object. Accordingly, items, such as video cards, video albums, etc., may be printed on paper, stored electronically, etc., and provided to another person. A user may then construct an output media object using visual representations on the items. This offers the advantage of increasing the value of a traditional medium, such as paper. For example, a paper card with a message is known. However, if a paper medium can be used to construct an output media object, value may be added to the paper medium. Also, because the output media object is constructed from information outputted on a paper medium, the medium may be portable and transported easily. For example, it may not be practical to give a compact disk or electronic storage device including an output media object to a user. However, a piece of paper that includes a visual representation that may be used to generate a media object may be easily given to a user.

Interactive Design Process

Figure 18:
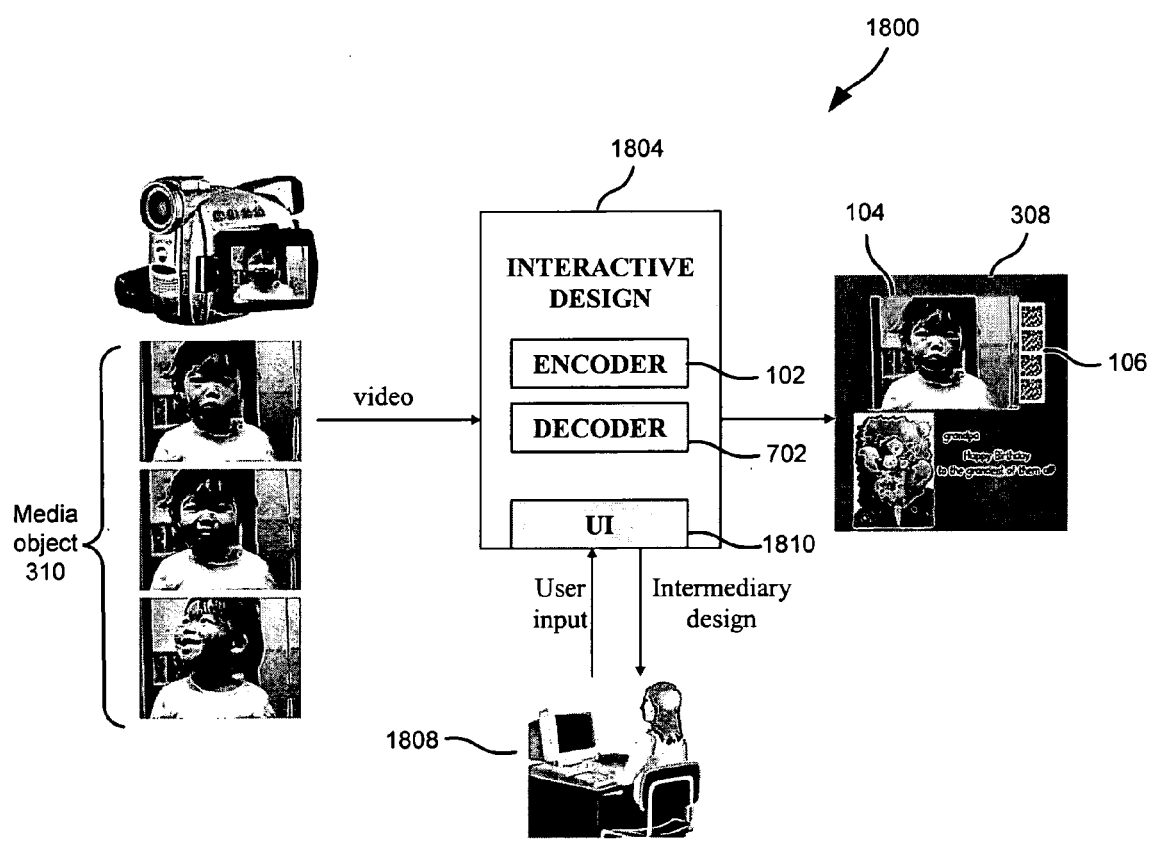
FIG. 18 depicts a system for determining a visual representation for an input media object according to one embodiment of the presentation invention.

FIG. 18 depicts a system 1800 for determining a visual representation for an input media object according to one embodiment of the presentation invention. As shown system 1800 includes an input media object 310, a design system 1804, a medium 308, and a client 1808.

Design system 1804 includes encoder 102, decoder 702, and a user interface 1810. User interface 1810 may be any graphical user interface. User interface 1810 may display output from encoder 102 and/or decoder 104 on client 1808 for a user to view.

Client 1808 may be any computing device configured to display user interface 1810. A user may determine if the output is acceptable or unacceptable and send user input from client 1808 to design system 1804 indicating as such. Also, it should be understood that determining whether the output is acceptable or unacceptable may be performed automatically. For example, thresholds for variables, such as resolution, size, etc., may be used to determine if the output is acceptable or unacceptable. The output may be acceptable if changes do not need to be made to the output and unacceptable if changes to the output are desired.

In one embodiment, encoder 102 is configured to generate first and second visual representations 104 and 106 as described above. User interface 1810 is then configured to display first and second visual representations 104 and 106 on client 1808. A user may then view first and second visual representations 104 and 106 and send user input indicating whether they are acceptable or unacceptable.

In one embodiment, decoder 702 may also create an output media object from the visual representation as described above. User interface 1810 is then configured to display the output media object on client 1808. A user may view the output media object and send user input indicating whether the output media object is acceptable.

If either first visual representation 104, second visual representation 106, and/or the output media object are not acceptable, design system 1804 is configured to generate different first visual representation 104, a different second visual representation 106, and/or a different output media object. This process continues until an indication that first visual representation 104, second visual representation 106, and the output media object are acceptable.

Figure 19:
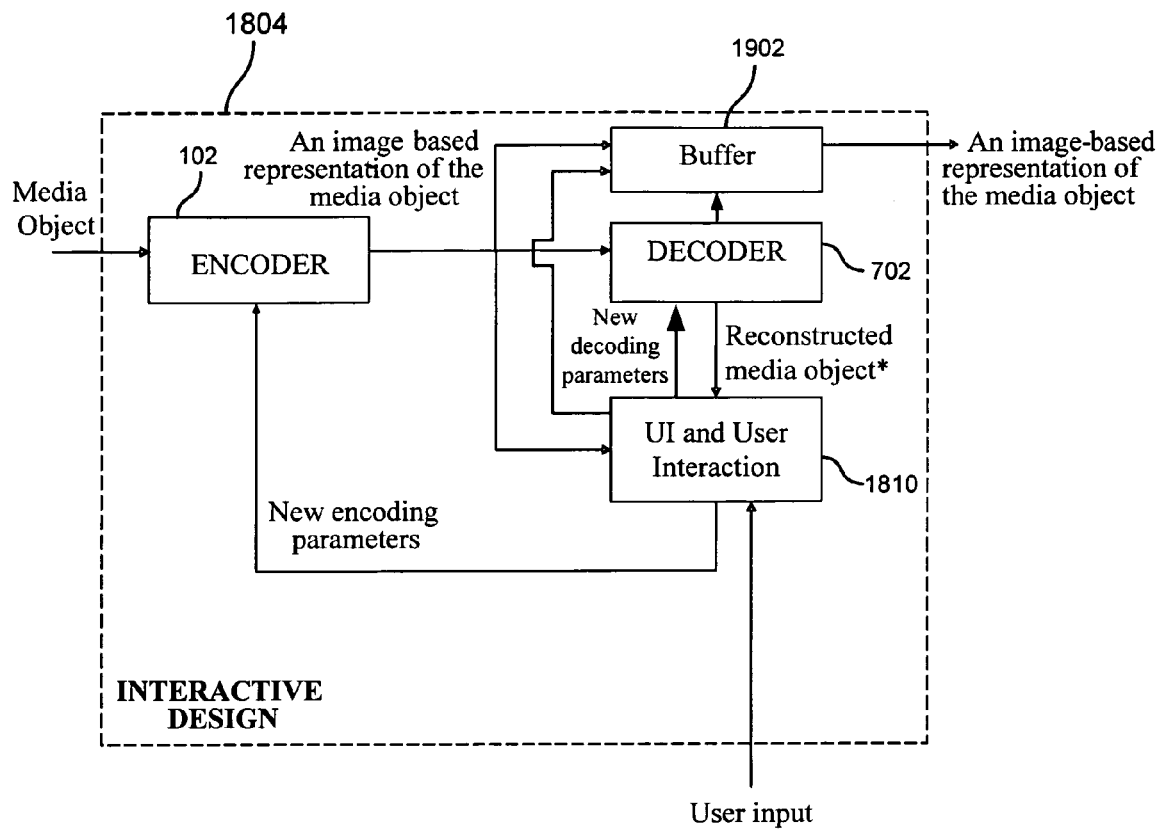
FIG. 19 depicts a simplified block diagram of a design system according to one embodiment of the present invention.

FIG. 19 depicts a simplified block diagram of a design system 1804 according to one embodiment of the present invention. Encoder 102 is configured to receive an input media object and output a first visual representation 104 and a second visual representation 106.

Encoder 102 determines first and second visual representations 104 and 106 based on a set of encoding parameters. The encoding parameters may include a number of reference frames, a size of a barcode, duration of a video, etc. In one embodiment, encoder 102 simulates an encoding process for an encoder. For example, using different encoding parameters, different encoders may be simulated, such as MPEG-4, MPEG-2, flash, etc. encoders. Accordingly, the process of generating first and second visual representations 104 and 106 as described above is simulated by encoder 102. First and second visual representations 104 and 106 are then sent to buffer 1902, decoder 702, and user interface 1810.

Buffer 1902 may be any storage medium capable of storing first and second visual representations 104 and 106. Buffer 1902 is used to buffer first and second visual representations 104 and 106 while it is determined if they are acceptable. They may be outputted if they are acceptable. If first and second visual representations 104 and 106 are not acceptable, they may be cleared from buffer 1902.

In order to create the output media object, decoder 702 receives first and second visual representations 104 and 106 and is configured to construct the output media object based on first and second visual representations 104 and 106. In one embodiment, decoder 702 is configured to simulate a device that constructs an output media object. For example, decoder 702 may use a set of decoding parameters that are used to construct the output media object. For example, different devices, such as cellular phones, computers, PDAs, etc., may construct an output media object differently. The resolution, size of the media object, etc., may be different depending on the device being used. Accordingly, the decoding parameters simulate a kind of device that may be used to generate an output media object. Decoder 702 then sends the output media object to user interface 1810 and buffer 1902.

The interactive design process may start after the encoding stage and/or the decoding stage. If the process starts after the encoding stage, first and second visual representations 104 and 106 may be displayed on user interface 1810 for a user to view. In this case, a user may be required to indicate if first and second visual representations 104 and 106 are acceptable or unacceptable. If they are, the process continues where an output media object is generated and displayed on interface 1810. A user may then indicate whether or not the output media object is acceptable or not.

If first and second visual representations 104 and 106 are not acceptable, the process may reiterate and generate first and second visual representations 104 and 106 again without generating an output media object. Accordingly, an unnecessary step of creating an output media object from unacceptable first and second visual representations 104 and 106 may be avoided.

In another embodiment, the design process may wait until an output media object is created from first and second visual representations 104 and 106. Then, first and second visual representations 104 and 106 and the output media object may be displayed on user interface 1810. A user may then decide if any of first and second visual representations 104 and 106 and output media object are acceptable or unacceptable.

User interface 1810 is thus configured to display first and second visual representations 104 and 106 and the output media object constructed based on first and second visual representations 104 and 106. An indication of whether first and second visual representations 104 and 106 and/or the output media object are acceptable may then be received from user interface 1810. The indication may indicate that any combination of the first visual representation 104, second visual representation 106 and the media object are acceptable or unacceptable.

If any one of first visual representation 104, second visual representation 106, and the media object are unacceptable, user interface 1810 communicates with encoder 102 and/or decoder 702 to perform the design process again. New encoding parameters may be used in encoder 102 and/or new decoding parameters used by decoder 702 in the new design process.

An indication of any parameters that may be changed and the values may be received from interface 1810. Also, system 1804 may also determine different encoding and/or decoding parameters automatically. The above process is performed again with the new encoding parameters and/or new decoding parameters. A new first and second visual representations 104 and 106 and/or output media object are then generated and outputted using interface 1810 as described above. If they are acceptable, the design process is finished. If they are not, then the process described above continues with new encoding parameters and/or new decoding parameters.

If first and second visual representations 104 and 106 and the output media object are acceptable, user interface 1810 communicates with buffer 1902 in order to output first and second visual representations 104 and 106. The design process is then finished.

Figure 20:
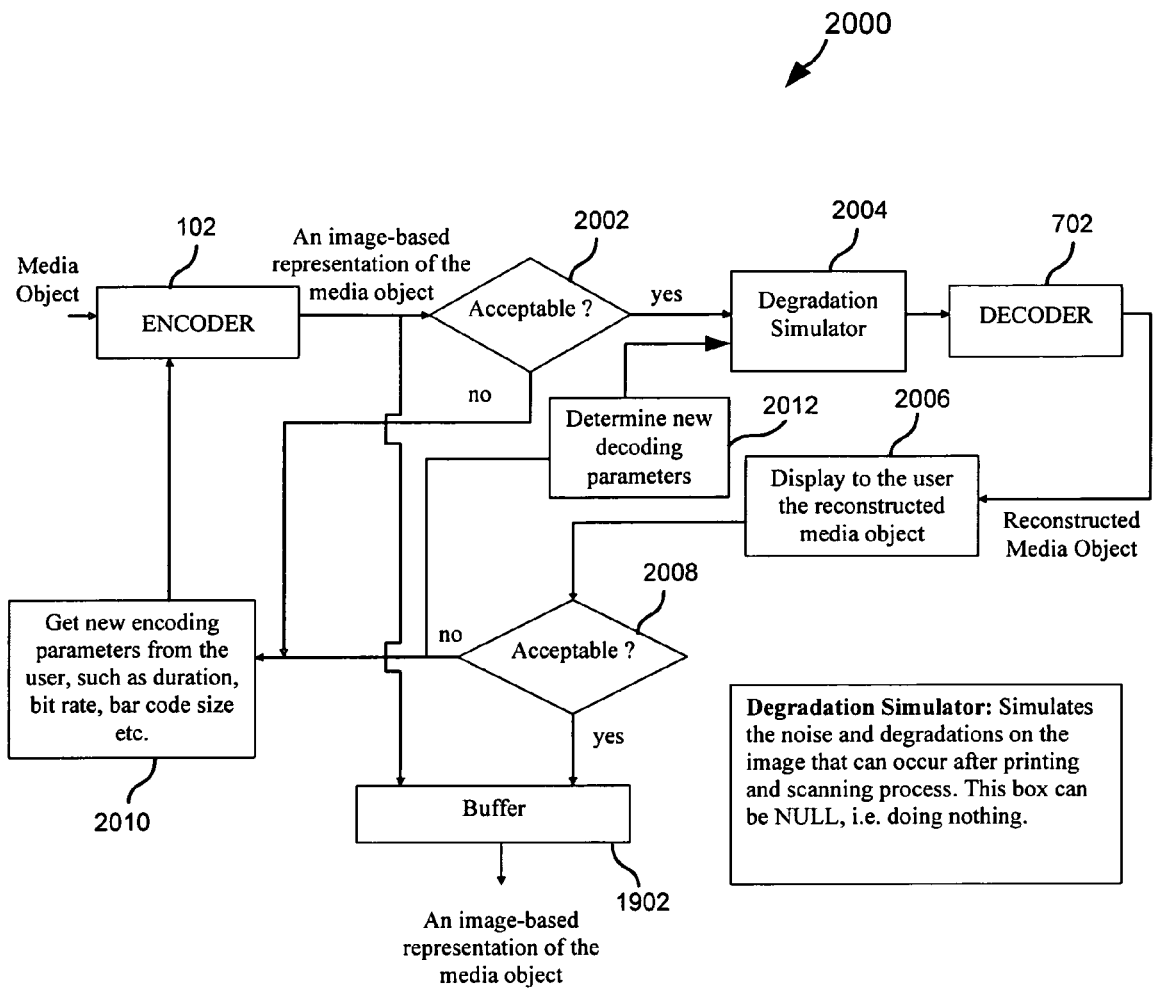
FIG. 20 depicts a simplified flowchart of a method for performing a design process according to one embodiment of the present invention.

FIG. 20 depicts a simplified flowchart 2000 of a method for performing a design process according to one embodiment of the present invention. As shown, encoder 102 receives an input media object and outputs first and second visual representations 104 and 106 based on the input media object. Encoder 102 also sends a copy of first and second visual representations 104 and 106 to a buffer 1902. As will be described below, if first and second visual representations 104 and 106 and an output media object constructed from first and second visual representations are acceptable, then first and second visual representations 104 and 106 may be outputted from buffer 1902.

In step 2002, it is determined if first and second visual representations 104 and 106 are acceptable. In one embodiment, first and second visual representations 104 and 106 may be displayed on user interface 1810. A user may then determine if they are acceptable. An input may then be received indicating whether first and second visual representations 104 and 106 are acceptable or unacceptable.

In another embodiment, a process may automatically determine if first and second visual representations 104 and 106 are acceptable or unacceptable. For example, parameters or thresholds may be set and used to determine if first and second visual representations 104 and 106 are acceptable. A threshold may indicate that a second visual representation 106 should be of a certain size. For example, a threshold may indicate that a barcode should be no more than an inch in width. If the barcode in second visual representation 106 exceeds this size, it may be automatically determined that second visual representation 106 is unacceptable.

If first and second visual representations 104 and 106 are not acceptable, the process proceeds to step 2010 where the encoding process may begin again using new encoding parameters. The process of using new encoding parameters will be described in more detail below.

If first and second visual representations 104 and 106 are acceptable, the process proceeds to a degradation simulator 2004. Degradation simulator 2004 simulates noise and degradations that may occur after first and second visual representations 104 and 106 are outputted on a medium 308, such as when are printed on a paper medium 308. For example, noise and degradation may occur on an image after printing or scanning. This noise or degradation may affect the decoding process in that less bits may be decoded for first visual representation 104 and second visual representation 106. It will be understood that degradation simulator 2004 may not be used in the process. For example, it may be determined that no noise or degradation may occur.

Decoder 702 receives first and second visual representations 104 and 106 from degradation simulator 2004 and outputs an output media object that is constructed based on first and second visual representations 104 and 106. Decoder 702 is configured to simulate a decoder that theoretically would output media object 308.

In step 2006, the output media object is displayed on user interface 1810. A user may then view the output media object and determine if it is acceptable or unacceptable.

In step 2008, input is received indicating whether the output media object is acceptable. In determining if the output media object is acceptable, the user may view the output media object and determine if it is acceptable based on a number of factors, such as resolution, speed, duration, bit rate, etc.

It should be understood that a process may also automatically determine if the output media object is acceptable. For example, thresholds or parameters may be used to determine if the output media object is acceptable or unacceptable. If the resolution or a bit rate is below a certain threshold, then it may be determined that the output media object is unacceptable. In this case, the step of displaying the constructed output media object to a user may be skipped.

If the output media object is acceptable, an indication that it is acceptable is sent to buffer 1902. Buffer 1902 then outputs first and second representation 104 and 106, which can then be outputted on a medium 308.

If the media object is unacceptable, then the process of generating first and second visual representations 104 and 106 and/or an output media object may be performed again. In step 2010, new encoding parameters may be determined. For example, parameters, such as duration, bit rate, barcode length for a second visual representation 106, etc., may be determined. These parameters may be received from a user or determined automatically.

Also, in step 2012, new decoding parameters may be determined. For example, a set of decoding parameters that were used to simulate the decoding process may be changed. The decoding parameters may be changed because a user may want to simulate a different decoding device. For example, a user may determine that the first decoded parameters were inappropriate for representing this media object.

After the new encoding parameters are determined, they are applied to encoder 102. New first and second visual representations 104 and 106 are generated from the input media object. Processing continues at step 2002 where it is determined if first and second visual representations 104 and 106 are acceptable or unacceptable. A new output media object is generated and displayed to a user in step 2006. New decoding parameters may or may not used. For example, a user may adjust the encoding parameters to generate new first and second visual representations 104 and 106. Accordingly, a user may want to see how a new output media object created from the new first and second visual representations 104 and 106 will look using the same decoding parameters. Also, a user may want to view the output media object created from first and second visual representations 104 and 106 as they would appear on a new decoder using new decoding parameters.

In step 2008, it is determined if the output media object is acceptable or unacceptable. If first and second visual representations 104 and 106 and the output media object are acceptable, the new first and second visual representations 104 and 106 are outputted from buffer 1902, and if not, the process continues with new encoding parameters and/or decoding parameters as described above.

Figure 21:
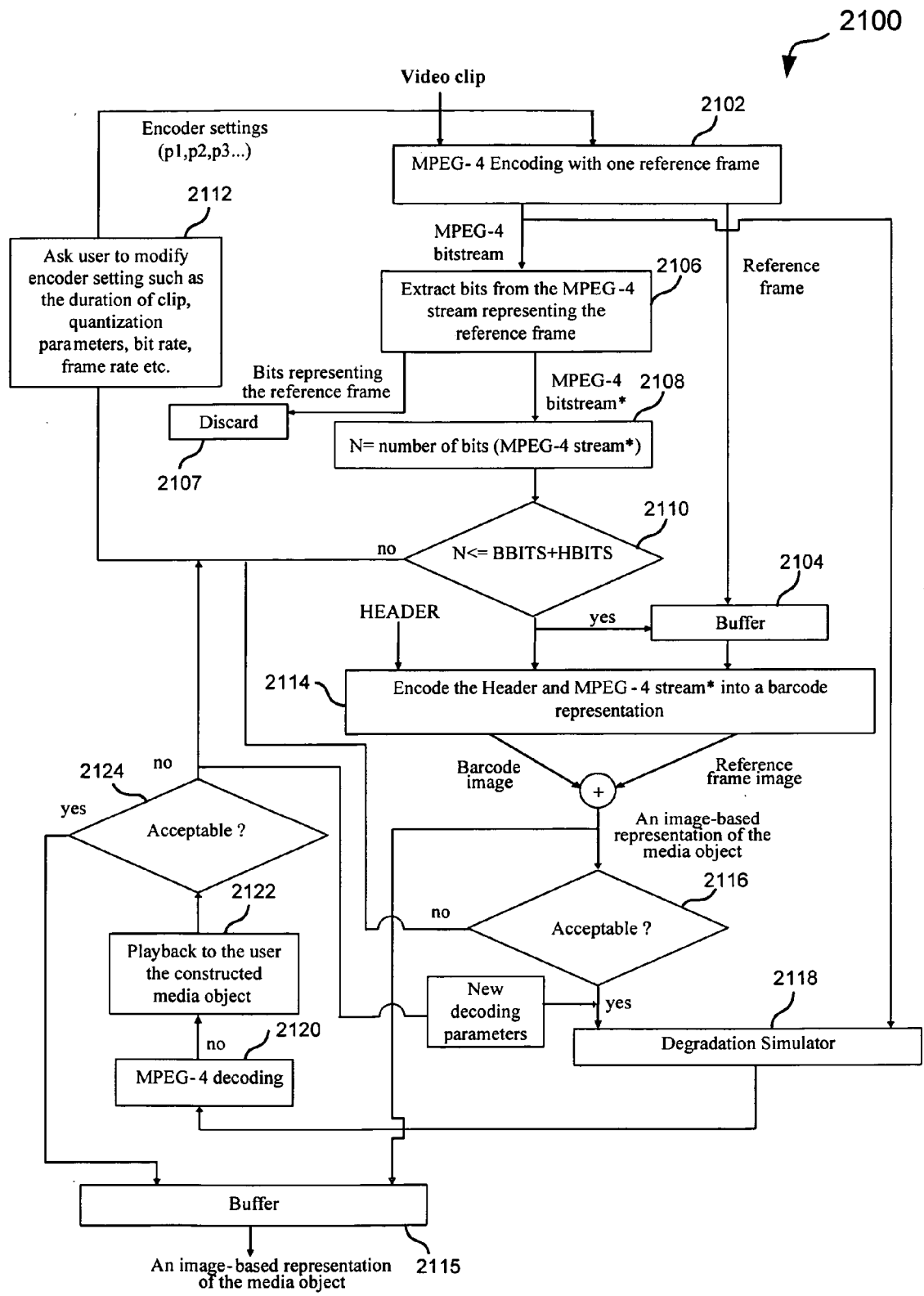
FIG. 21 depicts a simplified flowchart of a method for performing an interactive design process according to one embodiment of the present invention.

FIG. 21 depicts a simplified flowchart 2100 of a method for performing an interactive design process according to one embodiment of the present invention. In step 2102, a video clip is received and MPEG-4 encoding with one reference frame of the video clip is performed. An MPEG-4 bit stream is produced in addition to a reference frame. Although MPEG-4 encoding is described, it will be understood that any other encoding formats may be used. For example, MPEG-2 encoding may be used. The reference frame is then sent to a buffer 2104 for later data processing.

In step 2106, bits from the MPEG-4 bit stream that represent the reference frame are extracted. The bits from the reference frame are extracted because a second visual representation 104 should be generated without bits from the reference frame. The bit stream without the reference frame bits will be referred to as the "MPEG-4 bit stream*".

The MPEG-4 bit stream* is processed in step 2108, where a number of bits, N, in the MPEG-4 bit stream* and a header are determined. The header gives information specific to an application. For example, the header may include an identifier that is recognized by a decoding application.

In step 2110, if the number of N bits is not less than or equal to BBITS+HBITS, then the process will reiterate for another encoding. BBITS is a desirable number of bits to be printed in second visual representation 106 and HBITS is the number of bits required for a header. If the number of bits in the MPEG-4 bit stream* is greater than BBITS and HBITS, the second visual representation 106 may be larger than is desired because too many bits are encoded in it.

In a step 2112, encoder settings are modified. For example, the duration of the video clip, quantization parameters, bit rate, frame rate, etc., are modified for an encoding process. The new parameters are then used in MPEG-4 encoding in step 2102. The process proceeds as described with respect to steps 2106, 2108, and 2110 until the number of bits, N, in the MPEG-4 bit stream* is less than BBITS+HBITS.

In step 2114, if the number of bits in the MPEG-4 bit stream* is less than BBITS+HBITS, a header and MPEG-4 bit stream* are encoded into a second visual representation 106, such as a barcode representation. Additionally, the reference frame image is received from buffer 2104. The barcode representation and reference frame image are then used to generate a first visual representation 104 and a second visual representation 106. First and second visual representations 104 and 106 are then sent to a buffer 2115.

In step 2116, it is determined if first and second visual representations 104 and 106 are acceptable. If they are unacceptable, the process proceeds back to step 2112, where new encoding settings may be determined. If the first and second visual representations are acceptable, a degradation simulation is performed in step 2118.

The degradation simulation is performed with first and second visual representations 104 and 106 and the degraded first and second visual representations 104 and 106 are outputted to MPEG-4 decoder 2120. The output of MPEG-4 decoder 2120 is an output media object that is played back to a user in step 2122.

It is determined if the output media object is acceptable or not in step 2124. For example, input from a user may be received indicating whether or not the output media object is acceptable or not. If it is acceptable, then the process proceeds where first and second visual representations 104 and 106 stored in buffer 2115 are outputted. Accordingly, the design process is finished.

If the output media object is not acceptable, the process proceeds to step 2112 where the encoding parameters may be changed. Also, in step 2124, new decoding parameters may be used in performing a new decoding process. The process then proceeds as described above with the new encoding and/or decoding parameters.

Accordingly, embodiments of the present invention enable an interactive design process in which first and second visual representations and an output media object may be interactively determined. For example, acceptable first or second visual representations and/or media objects may be determined by changing the parameters. Accordingly, a user may determine how he/she would like a constructed output media object from first and second visual representations to look. This process may use simulation where devices that include an encoder and/or a decoder may not need to be used. Rather, a simulation of an encoder and/or decoder with parameters set for a device may be used in the encoding/decoding process. Accordingly, parameters may be changed in order to view how an output media object and first and second visual representations may look on the different devices.

The design process can be used in a photo-booth like application, where a user creates an input media object (for example a small video clip of the user smiling and giving kisses) and then uses the interactive design process to obtain a greeting card, which includes the representation of the input media object.

Another application can be an MFP (Multi Functional Printer) application, where the input media object is provided by a memory card, such as an SD card, and the user interacts with the MFP to obtain a satisfactory printout of the media object. Other examples include users of desktop PC's who design greeting cards by submitting video clips and would interact with a web browser design tool to allow them to modify the layout and final characteristics of the video greeting card. A similar interaction could take place at a kiosk in a convenience store.

Embodiments of the interactive design process provide many advantages. The generation of first and second visual representations and an output media object from the first and second visual representations may not a lossless process and many tradeoffs may be involved. For example, when representing a video clip with this process, if a small second visual representation (e.g., barcode) is desired, then a duration of a video clip may need to be very short. Also, depending on the media object type that is encoded, there may be many parameters that eventually affect how the final visual representation appears. Some of these parameters, such as quantization parameters, can be automatically adjusted based on the given constraints. However, adjusting some of the other parameters, such as the number of reference frames, size of the second visual representation (e.g., barcode), duration of video, is more subjective and may require user interaction.

Figure 22:
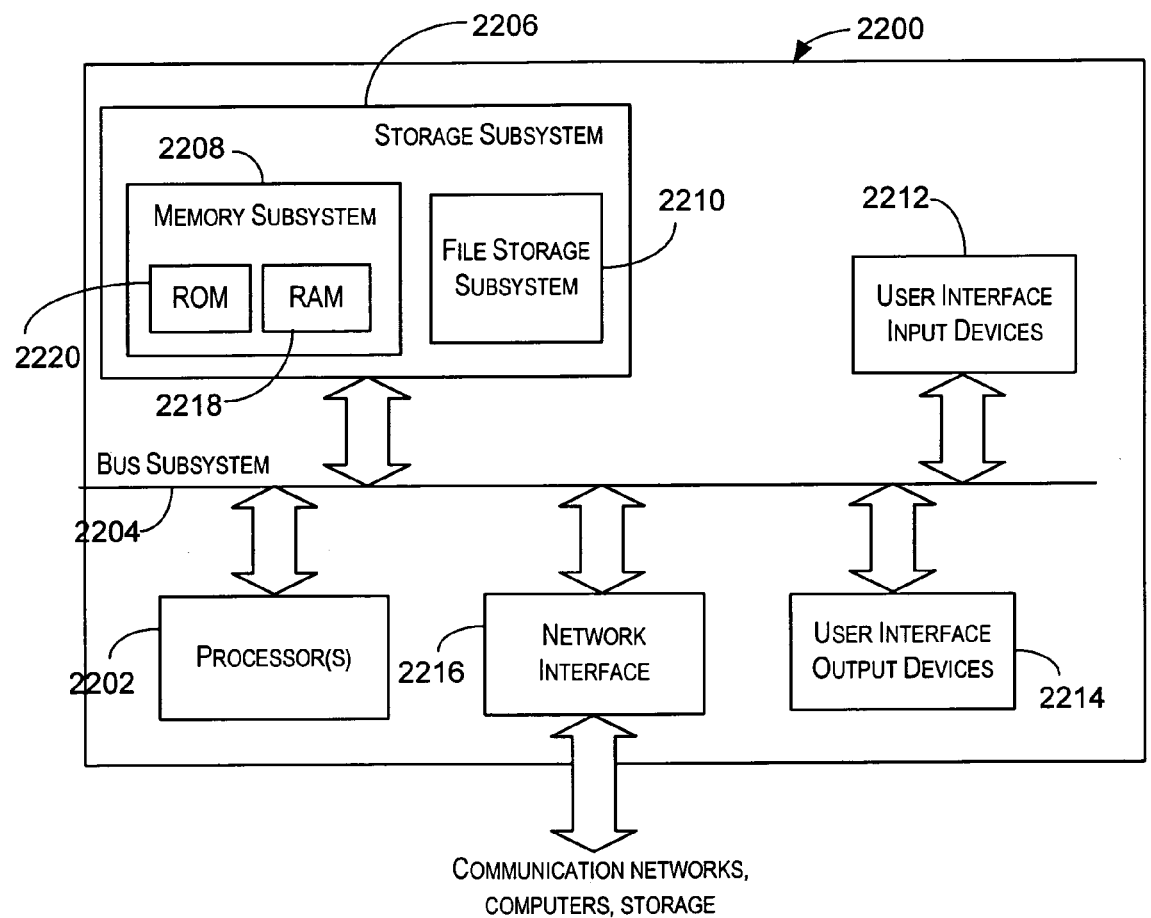
FIG. 22 is a simplified block diagram of data processing system that may be used to perform processing according to an embodiment of the present invention.

FIG. 22 is a simplified block diagram of data processing system 2200 that may be used to perform processing according to an embodiment of the present invention. As shown in FIG. 22, data processing system 2200 includes at least one processor 2202, which communicates with a number of peripheral devices via a bus subsystem 2204. These peripheral devices may include a storage subsystem 2206, comprising a memory subsystem 2208 and a file storage subsystem 2210, user interface input devices 2212, user interface output devices 2214, and a network interface subsystem 2216. The input and output devices allow user interaction with data processing system 2202.

Network interface subsystem 2216 provides an interface to other computer systems, networks, and storage resources. The networks may include the Internet, a local area network (LAN), a wide area network (WAN), a wireless network, an intranet, a private network, a public network, a switched network, or any other suitable communication network. Network interface subsystem 2216 serves as an interface for receiving data from other sources and for transmitting data to other sources from data processing system 2200. Embodiments of network interface subsystem 2216 include an Ethernet card, a modem (telephone, satellite, cable, ISDN, etc.), (asynchronous) digital subscriber line (DSL) units, and the like.

User interface input devices 2212 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information to data processing system 2200.

User interface output devices 2214 may include a display subsystem, a printer, a fax machine, or non-visual displays such as audio output devices. The display subsystem may be a cathode ray tube (CRT), a flat-panel device such as a liquid crystal display (LCD), or a projection device. In general, use of the term "output device" is intended to include all possible types of devices and ways to output information from data processing system 2200.

Storage subsystem 2206 may be configured to store the basic programming and data constructs that provide the functionality of the present invention. For example, according to an embodiment of the present invention, software modules implementing the functionality of the present invention may be stored in storage subsystem 2206. These software modules may be executed by processor(s) 2202. Storage subsystem 2206 may also provide a repository for storing data used in accordance with the present invention. Storage subsystem 2206 may comprise memory subsystem 2208 and file/disk storage subsystem 2210.

Memory subsystem 2208 may include a number of memories including a main random access memory (RAM) 2218 for storage of instructions and data during program execution and a read only memory (ROM) 2220 in which fixed instructions are stored. File storage subsystem 2210 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Bus subsystem 2204 provides a mechanism for letting the various components and subsystems of data processing system 2202 communicate with each other as intended. Although bus subsystem 2204 is shown schematically as a single bus, alternative embodiments of the bus subsystem may utilize multiple busses.

Data processing system 2200 can be of varying types including a personal computer, a portable computer, a workstation, a network computer, a mainframe, a kiosk, or any other data processing system. Due to the ever-changing nature of computers and networks, the description of data processing system 2200 depicted in FIG. 22 is intended only as a specific example for purposes of illustrating the preferred embodiment of the computer system. Many other configurations having more or fewer components than the system depicted in FIG. 22 are possible.

The present invention can be implemented in the form of control logic in software or hardware or a combination of both. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for determining a visual representation for an input media object, the method comprising:
    (a) determining, from the input media object and based on a set of encoding parameters, a first visual representation to be displayed or printed on a first tangible display medium and a separate second visual representation to be displayed or printed on a second tangible display medium, the first visual representation including a picture having reference information comprising at least one non-encoded key frame of the content of the input media object, the second visual representation including compact form machine-readable manipulation information operable to be applied to the reference information to generate output media information that is substantially similar to input media information of the input media object, the output media information including at least one of audio and visual information, the compact form machine-readable manipulation information of the second visual representation being unable to be used by itself to generate output media information that is substantially similar to input media information of the input media object;
    (b) creating an output media object to be displayed or printed on a third display medium from the first and second visual representations based on a set of decoding parameters and containing the output media information;
    (c) receiving an indication indicating that the first and second visual representations or the output media object are acceptable or unacceptable;
    (d) if the indication indicates that the first and second visual representations or the output media object are unacceptable, changing at least one parameter in an element selected from a group consisting of the set of encoding parameters and the set of decoding parameters;
    (e) performing steps (a)-(d) until an indication indicating that the first and second visual representations or the output media object are acceptable is received.

2. The method of claim 1, further comprising displaying the created output media object.

3. The method of claim 2, wherein receiving the indication comprises receiving input from a user in response to displaying the output media object indicating that the output media object is acceptable or unacceptable.

4. The method of claim 1, further comprising displaying the first and second visual representations.

5. The method of claim 4, wherein receiving the indication comprises receiving the input from a user in response to displaying the first and second visual representations indicating that the first and second visual representations are acceptable or unacceptable.

6. The method of claim 1, wherein determining the first and second visual representations comprises simulating the creation of the first and second visual representations.

7. The method of claim 1, wherein creating the output media object comprises simulating the creation of the output media object.

8. The method of claim 1, further comprising:
    buffering the first and second visual representations; and
    outputting the buffered first and second visual representations if the input indicates they are acceptable.

9. The method of claim 1, wherein the set of encoding parameters include one or more parameters that simulate an encoder.

10. The method of claim 1, wherein the set of decoding parameters comprise one or more parameters that simulate a decoder.

11. The method of claim 1, further comprising determining the at least one parameter to change based on input from a user.

12. The method of claim 1, wherein receiving the indication comprises determining if the first and second visual representations or the output media object are acceptable or unacceptable automatically.

13. A method for determining a first visual representation and a second visual representation for an input media object, the method comprising:
    (a) determining a first visual representation to be displayed or printed on a first tangible display medium and based on first information from the input media object, the first visual representation including a picture having reference information comprising at least one non-encoded key frame of the content of the input media object;
    (b) determining a second visual representation to be displayed or printed on a second tangible display medium and based on second information from the input media object, the second visual representation including compact form machine-readable manipulation information operable to be applied to the reference information to generate output media information that is substantially similar to input media information of the input media object, the output media information including at least one of audio and visual information, the compact form machine-readable manipulation information of the second visual representation being unable to be used by itself to generate output media information that is substantially similar to input media information of the input media object;
    (c) creating an output media object to be displayed or printed on a third display medium from the first and second visual representations and containing the output media information;
    (d) receiving an indication indicating that an element selected from a group consisting of the first visual representation, second visual representation, and the output media object are acceptable or unacceptable;
    (e) if the indication indicates that an element selected from a group consisting of the first visual representation, second visual representation, and the output media object are unacceptable, performing steps (a)-(d) to generate an element selected from a group consisting of a new first visual representation, a new second visual representation, and a new output media object until an indication indicating that the first visual representation, second visual representation, and the output media object are acceptable is received.

14. The method of claim 13, further comprising displaying the created output media object.

15. The method of claim 14, wherein receiving the indication comprises receiving input from a user in response to displaying the output media object indicating that the output media object is acceptable or unacceptable.

16. The method of claim 13, further comprising displaying the first and second visual representations.

17. The method of claim 16, wherein receiving the indication comprises receiving the input from a user in response to displaying the first and second visual representations indicating that the first and second visual representations are acceptable or unacceptable.

18. The method of claim 13, wherein determining the first visual representation and determining the second visual representation comprises simulating the creation of the one or more visual representations using encoding parameters.

19. The method of claim 18, wherein determining a new first visual representation or a new second visual representation comprises using new encoding parameters to determine the new first visual representation or a new second visual representation.

20. The method of claim 19, wherein the new encoding parameters are determined from user input.

21. The method of claim 19, wherein the new encoding parameters are determined automatically.

22. The method of claim 13, wherein creating the output media object comprises simulating the creation of the output media object using decoding parameters.

23. The method of claim 22, wherein determining a new output media object comprises using new decoding parameters to determine the new output media object.

24. The method of claim 23, wherein the new decoding parameters are determined from user input.

25. The method of claim 23, wherein the new decoding parameters are determined automatically.

26. The method of claim 13, further comprising:
buffering the first and second visual representations; and
outputting the buffered first and second visual representations if the input indicates they are acceptable.

27. The method of claim 13, wherein receiving the indication comprises determining if the first and second visual representations or the output media object are acceptable or unacceptable automatically.

28. A computer program product stored on a computer-readable storage medium for determining a visual representation for an input media object, the computer program product comprising:
(a) code for determining, from the input media object and based on a set of encoding parameters,
a first visual representation to be displayed or printed on a first display medium and a separate second visual representation to be displayed or printed on a second display medium, the first visual representation including a picture having reference information comprising at least one non-encoded key frame of the content of the input media object, the second visual representation including compact form machine-readable manipulation information operable to be applied to the reference information to generate output media information that is substantially similar to input media information of the input media object, the output media information including at least one of audio and visual information, the compact form machine-readable manipulation information of the second visual representation being unable to be used by itself to generate output media information that is substantially similar to input media information of the input media object;
(b) code for creating an output media object to be displayed or printed on a third display medium from the first and second visual representations based on a set of decoding parameters and containing the output media information, the first visual representation comprising a static picture and the second visual representation comprising a static machine-readable format;
(c) code for receiving an indication indicating that the first and second visual representations or the output media object are acceptable or unacceptable;
(d) if the indication indicates that the first and second visual representations or the output media object are unacceptable, code for changing at least one parameter in an element selected from a group consisting of the set of encoding parameters and the set of decoding parameters;
(e) code for performing the steps of elements (a)-(d) until an indication indicating that the first and second visual representations or the output media object are acceptable is received.

29. The computer program product of claim 28, further comprising code for displaying the created output media object.

30. The computer program product of claim 29, wherein the code for receiving the indication comprises code for receiving input from a user in response to displaying the output media object indicating that the output media object is acceptable or unacceptable.

31. The computer program product of claim 28, further comprising code for displaying the first and second visual representations.

32. The computer program product of claim 31, wherein the code for receiving the indication comprises code for receiving the input from a user in response to displaying the first and second visual representations indicating that the first and second visual representations are acceptable or unacceptable.

33. The computer program product of claim 28, wherein the code for determining the first and second visual representations comprises code for simulating the creation of the first and second visual representations.

34. The computer program product of claim 28, wherein the code for creating the output media object comprises code for simulating the creation of the output media object.

35. The computer program product of claim 28, further comprising:
code for buffering the first and second visual representations; and
code for outputting the buffered first and second visual representations if the input indicates they are acceptable.

36. The computer program product of claim 28, wherein the set of encoding parameters include one or more parameters that simulate an encoder.

37. The computer program product of claim 28, wherein the set of decoding parameters comprise one or more parameters that simulate a decoder.

38. The computer program product of claim 28, further comprising code for determining the at least one parameter to change based on input from a user.

39. The computer program product of claim 28, wherein the code for receiving the indication comprises code for determining if the first and second visual representations or the output media object are acceptable or unacceptable automatically.

40. A computer program product stored on a computer-readable storage medium for determining a first visual representation and a second visual representation for an input media object, the computer program product comprising:

(a) code for determining a first visual representation to be displayed or printed on a first tangible display medium and based on first information from the input media object, the first visual representation including a picture having reference information comprising at least one non-encoded key frame of the content of the input media object when printed on a tangible display medium;

(b) code for determining a second visual representation to be displayed or printed on a second tangible display medium and based on second information from the input media object, the second visual representation including compact form machine-readable manipulation information operable to be applied to the reference information to generate output media information that is substantially similar to input media information of the input media object, the output media information including at least one of audio and visual information, the compact form machine-readable manipulation information of the second visual representation being unable to be used by itself to generate output media information that is substantially similar to input media information of the input media object;

(c) code for creating an output media object to be displayed or printed on a third tangible display medium from the first and second visual representations and containing the output media information;

(d) code for receiving an indication indicating that an element selected from a group consisting of the first visual representation, second visual representation, and the output media object are acceptable or unacceptable;

(e) if the indication indicates that an element selected from a group consisting of the first visual representation, second visual representation, and the output media object are unacceptable, code for performing steps (a)-(d) to generate an element selected from a group consisting of a new first visual representation, a new second visual representation, and a new output media object until an indication indicating that the first visual representation, second visual representation, and the output media object are acceptable is received.

41. The computer program product of claim 40, further comprising code for displaying the created output media object.

42. The computer program product of claim 41, wherein the code for receiving the indication comprises receiving input from a user in response to displaying the output media object indicating that the output media object is acceptable or unacceptable.

43. The computer program product of claim 40, further comprising code for displaying the first and second visual representations.

44. The computer program product of claim 43, wherein the code for receiving the indication comprises code for receiving the input from a user in response to displaying the first and second visual representations indicating that the first and second visual representations are acceptable or unacceptable.

45. The computer program product of claim 40, wherein the code for determining the first visual representation and determining the second visual representation comprises code for simulating the creation of the one or more visual representations using encoding parameters.

46. The computer program product of claim 45, wherein the code for determining a new first visual representation or a new second visual representation comprises code for using new encoding parameters to determine the new first visual representation or a new second visual representation.

47. The computer program product of claim 46, wherein the new encoding parameters are determined from user input.

48. The computer program product of claim 46, wherein the new encoding parameters are determined automatically.

49. The computer program product of claim 40, wherein the code for creating the output media object comprises code for simulating the creation of the output media object using decoding parameters.

50. The computer program product of claim 49, wherein the code for determining a new output media object comprises code for using new decoding parameters to determine the new output media object.

51. The computer program product of claim 50, wherein the new decoding parameters are determined from user input.

52. The computer program product of claim 50, wherein the new decoding parameters are determined automatically.

53. The computer program product of claim 40, further comprising:
    code for buffering the first and second visual representations; and
    code for outputting the buffered first and second visual representations if the input indicates they are acceptable.

54. The computer program product of claim 40, wherein the code for receiving the indication comprises code for determining if the first and second visual representations or the output media object are acceptable or unacceptable automatically.

55. A data processing system for determining a visual representation for an input media object, the data processing system including a memory configured to store a plurality of instructions adapted to direct the data processing system to perform a set of steps comprising:

(a) determining, from the input media object and based on a set of encoding parameters, a first visual representation to be displayed or printed on a first tangible display medium and a separate second visual representation to be displayed or printed on a second tangible display medium, the first visual representation including a picture having reference information comprising at least one non-encoded key frame of the content of the input media object, the second visual representation including compact form machine-readable manipulation information operable to be applied to the reference information to generate output media information that is substantially similar to input media information of the input media object, the output media information including at least one of audio and visual information, the compact form machine-readable manipulation information of the second visual representation being unable to be used by itself to generate output media information that is substantially similar to input media information of the input media object;

(b) creating an output media object to be displayed or printed on a third display medium from the first and second visual representations based on a set of decoding parameters and containing the output media information;

(c) receiving an indication indicating that the first and second visual representations or the output media object are acceptable or unacceptable;

(d) if the indication indicates that the first and second visual representations or the output media object are unacceptable, changing at least one parameter in an element selected from a group consisting of the set of encoding parameters and the set of decoding parameters;

(e) performing steps (a)-(d) until an indication indicating that the first and second visual representations or the output media object are acceptable is received.

56. The system of claim 55, further comprising displaying the created output media object.

57. The system of claim 56, wherein receiving the indication comprises receiving input from a user in response to displaying the output media object indicating that the output media object is acceptable or unacceptable.

58. The system of claim 55, further comprising displaying the first and second visual representations.

59. The system of claim 58, wherein receiving the indication comprises receiving the input from a user in response to displaying the first and second visual representations indicating that the first and second visual representations are acceptable or unacceptable.

60. The system of claim 55, wherein determining the first and second visual representations comprises simulating the creation of the first and second visual representations.

61. The system of claim 55, wherein creating the output media object comprises simulating the creation of the output media object.

62. The system of claim 55, further comprising:
buffering the first and second visual representations; and
outputting the buffered first and second visual representations if the input indicates they are acceptable.

63. The system of claim 55, wherein the set of encoding parameters include one or more parameters that simulate an encoder.

64. The system of claim 55, wherein the set of decoding parameters comprise one or more parameters that simulate a decoder.

65. The system of claim 55, further comprising determining the at least one parameter to change based on input from a user.

66. The system of claim 55, wherein receiving the indication comprises determining if the first and second visual representations or the output media object are acceptable or unacceptable automatically.

67. A data processing system determining a first visual representation and a second visual representation for an input media object, the data processing system including a memory configured to store a plurality of instructions adapted to direct the data processing system to perform a set of steps comprising:
(a) determining a first visual representation to be displayed or printed on a first tangible display medium and based on first information from the input media object, the first visual representation including a picture having reference information comprising at least one non-encoded key frame of the content of the input media object;
(b) determining a second visual representation to be displayed or printed on a second tangible display medium and based on second information from the input media object, the second visual representation including compact form machine-readable manipulation information operable to be applied to the reference information to generate output media information that is substantially similar to input media information of the input media object, the output media information including at least one of audio and visual information, the compact form machine-readable manipulation information of the second visual representation being unable to be used by itself to generate output media information that is substantially similar to input media information of the input media object;
(c) creating an output media object to be displayed or printed on a third display medium from the first and second visual representations and containing the output media information;
(d) receiving an indication indicating that an element selected from a group consisting of the first visual representation, second visual representation, and the output media object are acceptable or unacceptable;
(e) if the indication indicates that an element selected from a group consisting of the first visual representation, second visual representation, and the output media object are unacceptable, performing steps (a)-(d) to generate an element selected from a group consisting of a new first visual representation, a new second visual representation, and a new output media object until an indication indicating that the first visual representation, second visual representation, and the output media object are acceptable is received.

68. The system of claim 67, further comprising displaying the created output media object.

69. The system of claim 68, wherein receiving the indication comprises receiving input from a user in response to displaying the output media object indicating that the output media object is acceptable or unacceptable.

70. The system of claim 67, further comprising displaying the first and second visual representations.

71. The system of claim 70, wherein receiving the indication comprises receiving the input from a user in response to displaying the first and second visual representations indicating that the first and second visual representations are acceptable or unacceptable.

72. The system of claim 67, wherein determining the first visual representation and determining the second visual representation comprises simulating the creation of the one or more visual representations using encoding parameters.

73. The system of claim 72, wherein determining a new first visual representation or a new second visual representation comprises using new encoding parameters to determine the new first visual representation or a new second visual representation.

74. The system of claim 73, wherein the new encoding parameters are determined from user input.

75. The system of claim 73, wherein the new encoding parameters are determined automatically.

76. The system of claim 67, wherein creating the output media object comprises simulating the creation of the output media object using decoding parameters.

77. The system of claim 76, wherein determining a new output media object comprises using new decoding parameters to determine the new output media object.

78. The system of claim 77, wherein the new decoding parameters are determined from user input.

79. The system of claim 77, wherein the new decoding parameters are determined automatically.

80. The system of claim 67, further comprising:
buffering the first and second visual representations; and
outputting the buffered first and second visual representations if the input indicates they are acceptable.

81. The system of claim 67, wherein receiving the indication comprises determining if the first and second visual representations or the output media object are acceptable or unacceptable automatically.

* * * * *